United States Patent [19]

Factor et al.

[11] Patent Number: 4,896,154
[45] Date of Patent: Jan. 23, 1990

[54] MAP DISPLAY SYSTEM FOR VEHICLE NAVIGATION

[75] Inventors: Richard C. Factor, Kinnelon; Terry L. Pearsall, Wayne; John A. Strowe, Irvington; Laura A. Nass, Piscataway, all of N.J.

[73] Assignee: Eventide Inc., Little Ferry, N.J.

[21] Appl. No.: 114,300

[22] Filed: Oct. 28, 1987

[51] Int. Cl.$^4$ .............................................. G08G 1/12
[52] U.S. Cl. .................................. 340/995; 340/990; 364/443; 364/449
[58] Field of Search .............. 340/995, 988, 990, 972; 364/449, 443, 428, 452, 460; 73/178 R

[56] References Cited

U.S. PATENT DOCUMENTS

| | | | |
|---|---|---|---|
| 3,899,662 | 8/1975 | Kreeger et al. | 340/995 |
| 4,086,632 | 4/1978 | Lions | 340/995 |
| 4,360,876 | 11/1982 | Girault et al. | |
| 4,417,309 | 11/1983 | Harvey | 340/995 |
| 4,419,079 | 12/1983 | Georges et al. | |
| 4,489,389 | 12/1984 | Beckwith et al. | |
| 4,499,491 | 2/1985 | Aron et al. | 340/995 |
| 4,608,656 | 8/1986 | Tanaka et al. | |
| 4,638,438 | 1/1987 | Endo et al. | |
| 4,646,089 | 2/1987 | Takanabe et al. | |
| 4,661,811 | 4/1987 | Gray et al. | 340/995 |
| 4,689,747 | 8/1987 | Kurose et al. | 340/995 |
| 4,744,033 | 5/1988 | Ogawa et al. | 364/449 |

OTHER PUBLICATIONS

"A Novel Approach to Automotive Navigation and Map Display", Stanley K. Honey and Walter B. Zavoli, *IEEE Transactions on Industrial Electronics*, vol. IE-34, No. 1, Feb. 1987, pp. 40-43.

Primary Examiner—Joseph A. Orsino
Assistant Examiner—Brent A. Swarthout
Attorney, Agent, or Firm—Ostrolenk, Faber, Gerb & Soffen

[57] ABSTRACT

A map display system includes a vehicle symbol positioned in relation to background map data, and provides a large amount of relevant, easy-to-read map data to a user in a brief period of time. A first feature of the invention involves the drawing of aircraft landing and take-off areas in true size and orientation relative to background map data. A second feature involves display of navigation control areas in relation to an aircraft symbol. In accordance with a third feature, a user can select for display only objects meeting preselected criteria, such as airports having runways of a minimum length. A user can select an object for which text appears on the screen adjacent to that object and which may indicate relative position or distance to such object from the vehicle, in accordance with a fourth feature. A user can select full screen text of information concerning an object on a screen display, in accordance with a fifth feature. A sixth feature provides an automatic alert for an increased oncoming minimum safe altitude for aircraft flight. In an seventh feature, background map data is held stationary while a vehicle symbol moves in relation to the background map data. An emergency aircraft mode of operation, in accordance with an eighth feature, causes automatic display of at least a predetermined number of suitable landing sites according to preselected criteria, such as minimum runway length. A ninth feature involves display of planned and actual travel patterns of a vehicle.

6 Claims, 20 Drawing Sheets

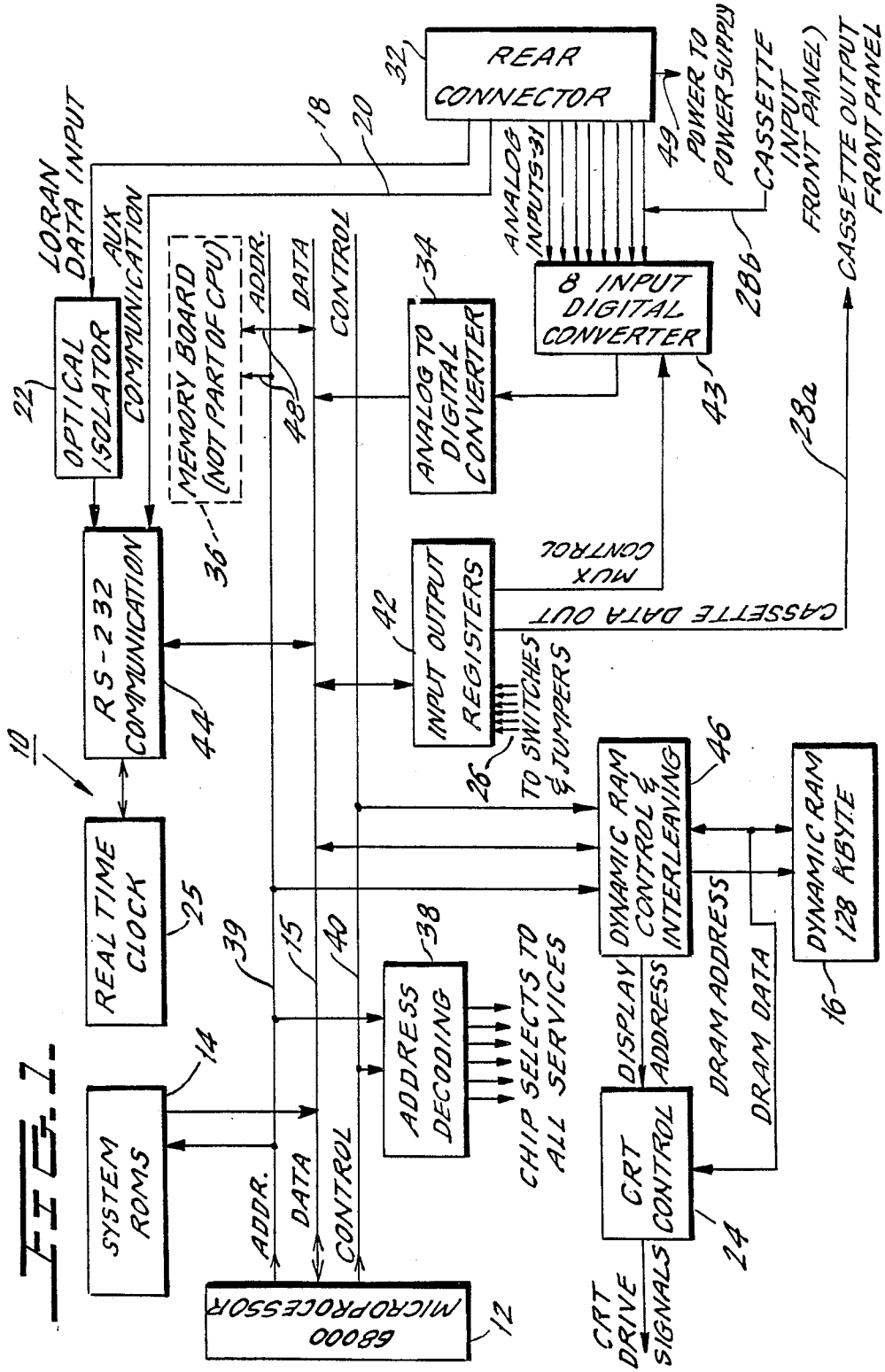

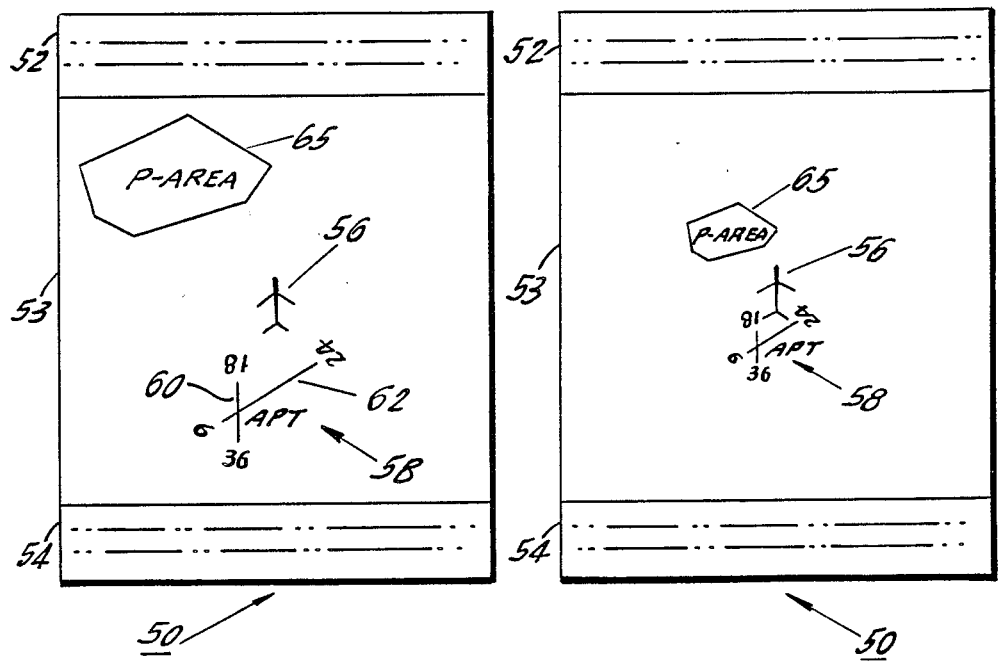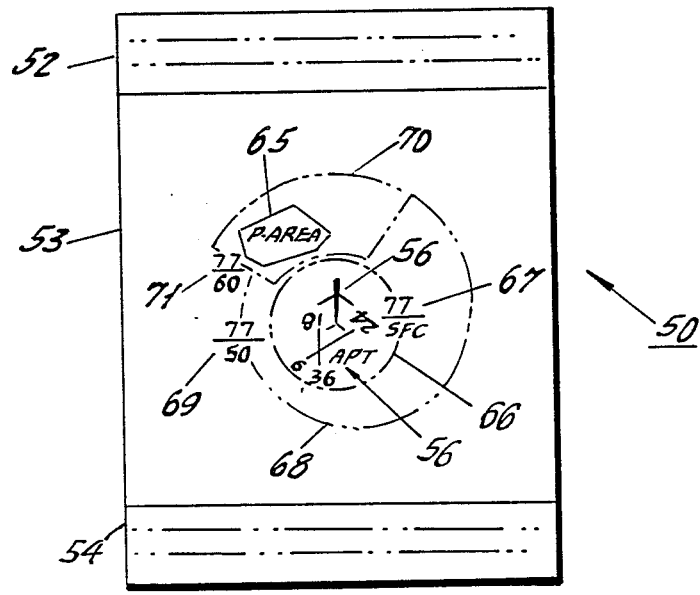

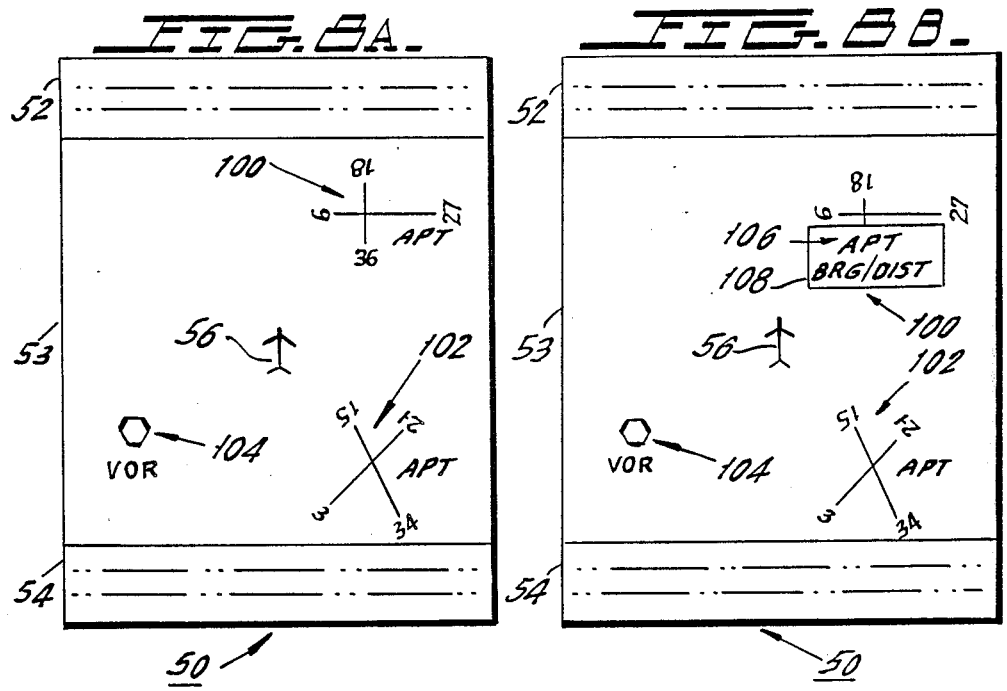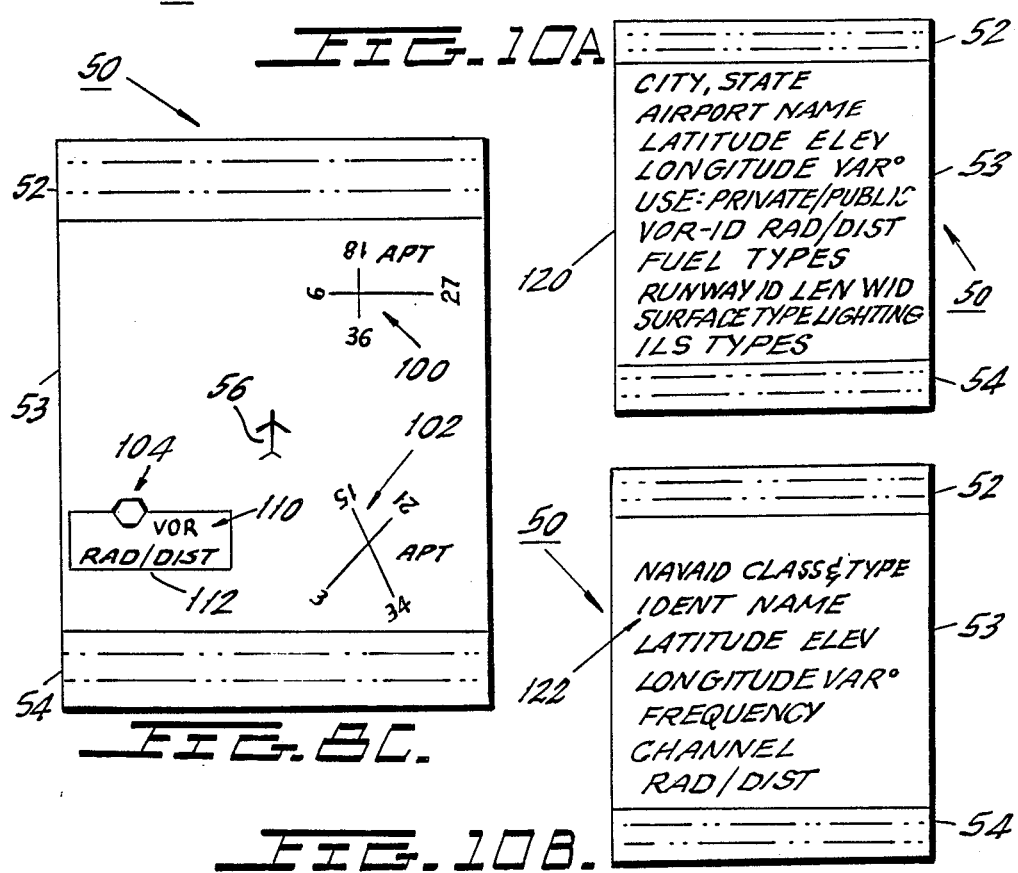

(A)

↓

DISPLAY THE IDENTIFIER, BEARING AND DISTANCE OF
THE VOR OR VORTAC ACROSS THE BOTTOM OF THE DISPLAY.
AS THE PLANE MOVES, CONTINUALLY UPDATE THIS
BEARING AND DISTANCE.
↘ 1712

↓

DISPLAY THE IDENTIFIER AND COMMUNICATIONS
FREQUENCIES FOR THE SELECTED LANDING FACILITY
BELOW THE MAIN DISPLAY.
↘ 1714

↓

CALCULATE THE DISTANCE AND BEARING FROM THE
AIRCRAFT TO THE SELECTED LANDING FACILITY.
↘ 1716

↓

DISPLAY THE BEARING AND DISTANCE OF THE
PRESELECTED LANDING FACILITY ABOVE THE MAIN
DISPLAY. AS THE PLANE MOVES, CONTINUALLY
UPDATE THIS BEARING AND DISTANCE.
↘ 1718

↓

( DONE )— 1720

FIG. 17B.

MAP DISPLAY SYSTEM FOR VEHICLE NAVIGATION

BACKGROUND AND SUMMARY OF THE INVENTION

The present invention relates to map display systems to aid in vehicle navigation, and more particularly to such systems which receive position and direction of travel data for a vehicle and provide a symbol on a screen display to show location and direction of the vehicle relative to background map data.

Map display systems have been used in the past to aid in navigation of an automobile or other land-based vehicle. Such systems incorporate means to determine the position and direction of travel of the vehicle, and show a vehicle symbol in relation to background map data.

Users of the known map display systems for navigation of a land-based vehicle typically have ample time for observing the map display. For navigation of an airborne vehicle, however, the pilot often has scant time to contemplate map displays. To meet the needs of a pilot, a map display system should convey to the pilot a maximum amount of relevant, easy-to-read information in a brief period of time.

It is, accordingly, a main object of the invention to provide a map display system that is particularly useful for navigation of an airborne vehicle.

A further object of the invention is to provide a map display system for an airborne vehicle conveying to the pilot a large amount of relevant, easy-to-read information in a brief period of time.

It is a further object of the invention to provide a map display system with safety features tailored for navigation of an airborne vehicle.

In accordance with a first feature of the invention, a map display system is provided for navigation of an aircraft showing landing and take-off areas in true size and orientation in relation to background map data. The system comprises memory means to store map data of an area in which the aircraft may travel. Such data includes reference points of landing and take-off areas in one memory location and true size and orientation of the landing and take-off areas in another memory location. A first means composes a first image component of a symbol for the aircraft. A second means selectively collects map data from the memory means and composes a second image component of such data. Means are provided to receive position and direction of travel data for the aircraft and to determine placement of the first image component relative to the second image component. A third means selectively collects from the memory means map data of true size and orientation of landing and take-off areas within the range of the second image component and composes a third image component of such landing and take-off areas aligned with and in true size proportion to the second image component. A display means is provided to collectively display the first, second and third image components.

In accordance with a second feature of the invention, a map display system for navigation of an aircraft shows navigation area boundaries, such as terminal control areas, in relation to the aircraft. The system comprises memory means to store map data of an area in which the vehicle can travel. Such data includes boundaries of navigation areas. A first means composes a first component of a symbol for the aircraft, whereas the second means selectively collects map data from the memory means, including data of navigation area boundaries, and composes a second image component of such data. The system includes means to receive position and direction of travel data for the aircraft and to determine placement of the first image component relative to the second image component. A display means then collectively displays the first and second image components.

In accordance with a third aspect of the invention, a map display system is provided for navigation of a vehicle with display of objects meeting user-selected criteria. The system comprises memory means to store map data of an area in which the vehicle may travel. A first means is used to compose a first image component of a symbol for the vehicle; and a second means is used to selectively collect map data from the memory means of objects which meet user-selected criteria and composes a second image component of such data. The system includes means to receive position and direction of travel data for the vehicle and to determine placement of the first image component relative to the second image component. A display means is used to collectively display the first and second image components.

A fourth feature of the invention provides a map display system for navigation of a vehicle showing text on map data for a user-selected object. The system comprises memory means to store data of objects in an area in which the vehicle may travel and also of text data concerning objects in the map data. A first means is used to compose a first image component of a symbol for the vehicle, and a second means is used to selectively collect map data from the memory means and to compose a second image component of such data. The system includes a means to receive position and direction of travel data for the vehicle and to determine placement of the first image component relative to the second image component. A third means selectively collects data concerning a user-selected object from the memory means and composes a third image component based on such data and including text of such data. A display means collectively displays the first, second and third image components.

A map display system for navigation of a vehicle, in accordance with a fifth feature of the invention, shows text concerning a user-selected object. The system comprises memory means to store map data of an area in which the vehicle may travel, and of text data concerning objects in the map data. A first means is used to compose a first image component of a symbol for the vehicle, and a second means is used to selectively collect map data from the memory means and to compose a second image component of such data. A means is used to receive position and direction of travel data for the vehicle and to determine placement of the first image component relative to the second image component. A third means is used to selectively collect from the memory means text data concerning a user-selected object and to compose a third image component including such text data. A display means is used to alternatively display, at the command of the user, the first and second image components, collectively, or the third image component including text.

A sixth feature of the invention provides a map display system for navigation of an airborne vehicle with an alert for an increased oncoming minimum safe altitude. The system comprises memory means to store map data of an area in which the airborne vehicle may travel. Such data includes minimum safe altitude information. A first means is used to compose a first image component of a symbol for the vehicle, and a second means is used to selectively collect map data from the memory means and to compose a second image component of such data. Means are used to receive position and direction of travel data for the vehicle and to determine placement of the first image component relative to the second image component. A fourth means is used to scan minimum safe altitude information in a first range including the vehicle and to broadcast an alert when an upcoming minimum safe altitude exceeds that for a second, smaller range including the vehicle by a predetermined amount.

A seventh aspect of the invention provides a map display system for navigation of an airborne vehicle showing a moving aircraft symbol on a stationary background. The system comprises memory means to store map data of an area in which the vehicle may travel. Such map data includes a user-selected waypoint. A first means is used to selectively collect from the memory means map data including the user-selected waypoint and to compose a static first image component of such data with the waypoint contained in the first image component and the first image component oriented in a predetermined direction. A second means is used to compose a second image component of a symbol for the vehicle, including means to repeatedly recompose the second image component to show vehicle movement relative to the first image component. The system includes means to receive position and velocity data for the vehicle and to determine the placement of the first image component relative to the second image component. A display means collectively displays the first and second image components.

An eighth feature of the invention provides a map display system for navigation of an airborne vehicle with emergency display of nearest suitable landing sites. The system comprises memory means to store map data of an area in which the vehicle may travel. Such map data includes symbols of and text concerning landing sites and navigational aids identified by respective criteria. A first means is used to compose a first image component of a symbol for the vehicle. A second means is used to selectively collect from the memory means map data including at least a predetermined number of suitable landing sites, determined on the basis of user-select criteria. The second means also is used to compose a second image component of such data. The system includes means to receive position and direction of travel data for the vehicle and to determine placement of the first image component relative to the second image component. Display means are used to collectively d splay the first and second image components.

In accordance with a ninth aspect of the invention, a map display system for navigation of a vehicle shows an actual travel pattern of the vehicle. The system comprises memory means to store data of an area in which the vehicle may travel, first means to compose a first image component of a symbol for the vehicle, and second means to selectively collect map data from the memory means and to compose a second image component of such data. The system includes means to receive position and direction of travel data of the vehicle and to determine placement of the first image component relative to the second image component. A third means, responsive to the first means, stores data of and composes a third image component of an actual travel pattern of the vehicle, and repetitively updates such data and recomposes the third image component as the vehicle travels. A display means is used to collectively display the first, second and third image components.

BRIEF DESCRIPTION OF THE DRAWINGS

The above objects as well as other objects of this invention shall become readily apparent after reading the following description of the accompanying drawings in which:

FIG. 1 is a block diagram of a microprocessor-based hardware system that may be used in carrying out the features of the present invention;

FIGS. 2A and 2B show typical screen displays for illustrating the display of landing and take-off areas in true size and orientation in relation to background map data;

FIG. 4 shows a screen display with navigational areas, such as a terminal control area, in relation to an aircraft symbol;

FIG. 6A illustrates a cluttered screen display, whereas FIGS. 6B and 6C illustrate the same screen display but showing only objects selected by criteria;

FIG. 8A shows a typical screen display, whereas FIG. 8B shows text provided in a box adjacent an airport, and FIG. 8C similarly shows text provided in a box near a navigational aid;

FIGS. 10A and 10B show typical, full screen text information of a landing facility and a navigational aid, respectively;

FIG. 16A shows a typical screen display, with a first displayed range, whereas FIG. 16B shows an emergency mode screen display at a different, automatically selected range including a predetermined number of suitable landing sites and also text of relevant navigational information;

FIGS. 17A and 17B show a flow chart used to implement the features of FIG. 16B; and FIG. 18A shows a screen display with an aircraft symbol approaching a preselected flight pattern, whereas

DESCRIPTION OF THE PREFERRED EMBODIMENTS

System Hardware

Figure 3A:
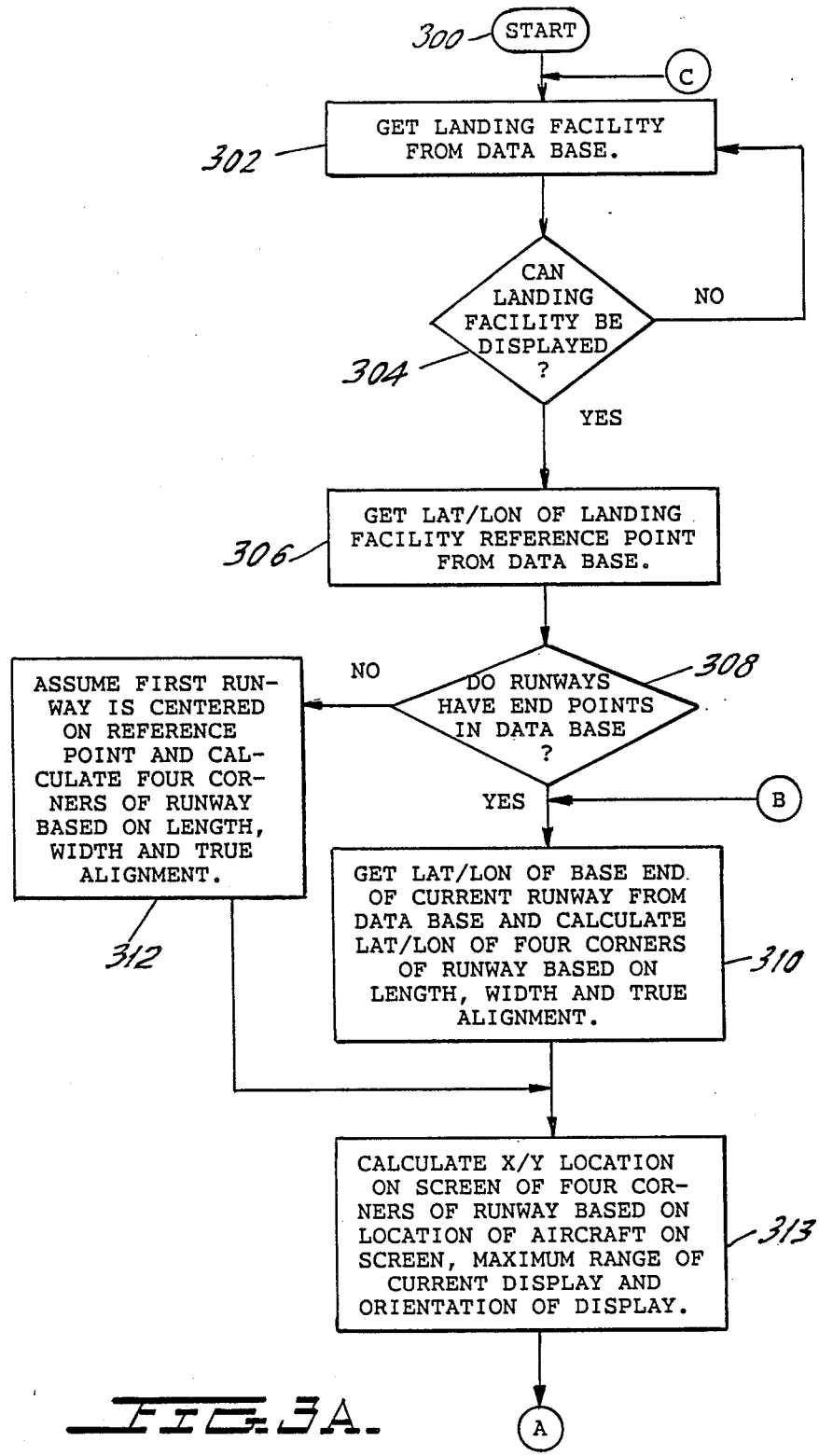
FIGS. 3A and 3B show a flow chart used to implement the features of FIGS. 2A and 2B.

The present map display system is preferably implemented on a microprocessor-based computer system, such as shown at 10 in FIG. 1. System 10, which is typically contained on a single printed-circuit board may include, by way of example, the following features:

(1) A 68000 32 bit microprocessor 12 running at 10 MHz.

(2) 128 Kbytes of system ROM 14.

(3) 128 Kbytes of RAM 16.

(4) Two RS-232C ports 18 and 20, one of which (18) has an opto-isolator 22 in its input.

(5) High resolution, bit-mapped graphics cathode-ray tube (CRT) display controller 24.

(6) A real-time clock 25 with a battery (not shown) for continuous operation.

(7) Non-volatile RAM contained in block 25 for storing installation settings and display options.

(8) Connections 26, including four for front panel switches.

(9) A mini phone jack 28a, 28b for cassette upload and download.

(10) Eight analog inputs 31 from a connector 32 to an eight bit Analog-to-Digital (A/D) converter 34, with one input dedicated to cassette input 28b.

(11) Connectors for a "piggy back" memory board 36 with backup battery power.

Microprocessor 12 is a 16/32 bit machine. Data bus 15 is 16 bits wide but the internal registers are 32 bits. Thus, microprocessor 12 allows arithmetic operations to proceed either 8, 16 or 32 bits at a time.

Most of the address decoding functions in system 10 are performed by a Decode Programmable Array Logic (PAL) 38. This is a 20L10 type device which contains a large number of undedicated logic devices. These undedicated devices are configured by a PAL programmer so that they will perform a specific set of logic functions. Specifically, the PAL looks at the address bus 39 and control signals 40 and generates "Chip Select Signals" for the various chips and devices in the system.

The software that microprocessor 12 executes to perform all the functions of system 10 set forth below resides in system ROMs 14. Also contained in these ROMs are the vectors, system constants and other data that microprocessor 12 requires in order to perform its assigned functions.

Input/Output (I/O) registers 42 are composed of two chips: a 74HCT244 Octal Buffer and a 74HCT273 Octal Latch. When microprocessor 12 accesses this area of the address space, one of these two chips are selected. Which chip is enabled depends on whether a read or write is being done. The I/O registers 42 allow microprocessor 12 to read external conditions such as may be provided by front panel switches, as well as to control the operation of an Analog Multiplexer (MUX) 43 and cassette output 30.

A 68681 Dual Universal Asynchronous Receiver/Transmitter (DUART) chip in block 44 provides communication between system 10 and other instruments in an aircraft. Such communication is done via RS-232C serial data transfer protocol. "RS-232C" data is that provided as an output by a commercially-available LORAN C receiver, a known device, operating in accordance with an industry standard, and providing vehicle position and direction of travel data to a "monitored" aircraft. DUART chip 44 handles most of the work in providing communications. A crystal in DUART chip 44 provides basic timing for the baud rate generator section of DUART chip 44 which times the arrival and transmission of individual bits of serial data Opto-isolator 22 allows the LORAN receiver, navigation computer or other data sources in an aircraft to be interfaced to system 10 without direct electrical connection to the system circuitry. Thus, any failures within system 10 should not disrupt the operation of other devices on the aircraft. An RS-232C receiver/driver chip 44 comprises a MAX 232 chip and contains circuitry to convert the +5 volt system power to +/−10 volts to drive RS-232C busses 20.

Real-time-clock 25 performs a number of functions for system 10. It maintains the current time of day and current date; generates a stream of timed interrupts; contains 32 bytes of non-volatile RAM; generates a so-called /RESET signal for initializing system hardware when power is applied; and contains a so-called "Watchdog Timer" to generate a reset command for bringing the system to a functioning state after the software ceases to function.

In system 10 one set of dynamic RAM (DRAM) chips 16 are shared between the microprocessor and the display. DRAMs 16 are controlled by a controller 46, which includes a DRAM control PAL to handle all decoding, timing and arbitration logic to control the DRAM. Controller 46 also includes a RAM address multiplexer. A 6845 CRT controller 24 generates timing for a CRT display and for addresses for the RAM data to be displayed on the CRT screen.

DRAMS 16 contain, for example, a bit-mapped image shown on a display screen (not illustrated) under the control of CRT controller 24. In creating an image, microprocessor 12 writes data into an area of DRAM 16. Various image components can thus be created for screen display. DRAM 16 is also used to store tables of information retrieved from ROM memory 14.

Some of the data received from other systems on an aircraft are in the form of analog voltages. A/D converter 34 converts these analog signals from analog inputs 36 into binary numbers in order for microprocessor 12 to perform calculations. These analog inputs might represent, for example, the heading output from the aircraft's slaved compass or directional gyroscope. Such heading information can be displayed in addition to the information provided by the features of the invention set forth below. Associated with A/D converter 34, but not shown, are signal conditioning circuits and an input multiplexer.

Two connectors 48 are used to connect additional memory to the circuit board for system 10. This memory is called "external" because it is external to a printed circuit board for system 10, although it may be contained in the same assembly. It will typically contain a data base with information for generating map displays.

Lead 49 from rear connector 32 goes to a system power supply (not shown), preferably of the type disclosed and claimed in copending and commonly assigned application Ser. No. 100,253, filed on Sept. 23, 1987, by Jon D. Paul, entitled "Improvements in Power Supply Design." The entirety of the foregoing application is incorporated herein by reference.

Aircraft Landing and Take-Off Areas Shown in True Size and Orientation in Relation to Background Map Data FIG. 2A shows a screen display 50 of a cathode ray tube, for example, containing map information in accordance with the invention. Screen display 50 includes, as referred to herein, an upper display portion 52, a main display portion 53, and a lower display portion 54. Upper and lower display portions 52 and 54 may contain text of useful navigation information, such as aircraft heading and ground speed, which may be obtained by known equipment. Main display 53 portrays map data of an area in which an aircraft vehicle may travel, and a symbol 56 for the aircraft. In the mode of display shown, symbol 56 is centered in main display 53, and remains stationary in the display.

Map display 53 shows an airport 58, designated by the abbreviation "APT". Two runways 60 and 62 are shown in airport 58, and typically are shown if they are greater than 2000 feet in length, regardless of surface type. Runways 60 and 62, further, are shown with identifiers at each runway end, orthogonal to the associated runways and indicating the first one or two digits of a magnetic compass heading that a pilot would follow to land on such runway. The identifiers at each runway end are readable by a pilot except when the displayed range is quite large.

Display 53 further shows a prohibited area 65 in main display 53, and may represent airspace in which civilian aircraft are prohibited from flying.

Map display 53 shows airport runways 60 and 62 in true size and orientation with respect to the background map data. The runways are shown in true proportion to the background map data, which changes in scale at user command. In the past, pilots would need to consult two different map sources to determine some of the information shown in display 53: one source would give airport location, and the other would give true size and orientation of airport runways. The pilot, however, would still not see a runway in true proportion to background map data.

FIG. 2B illustrates a screen display 50 with main display portion 53 showing an aircraft symbol 56 and the surrounding map data reduced in size compared to FIG. 2A. Display 53 of FIG. 2B thus shows a greater range of distance than in FIG. 2A. The runways of airport 58 are reduced in size to bear true relation with background map data. Aircraft symbol 56 may be reduced in size, also, if desired.

Figure 3B:
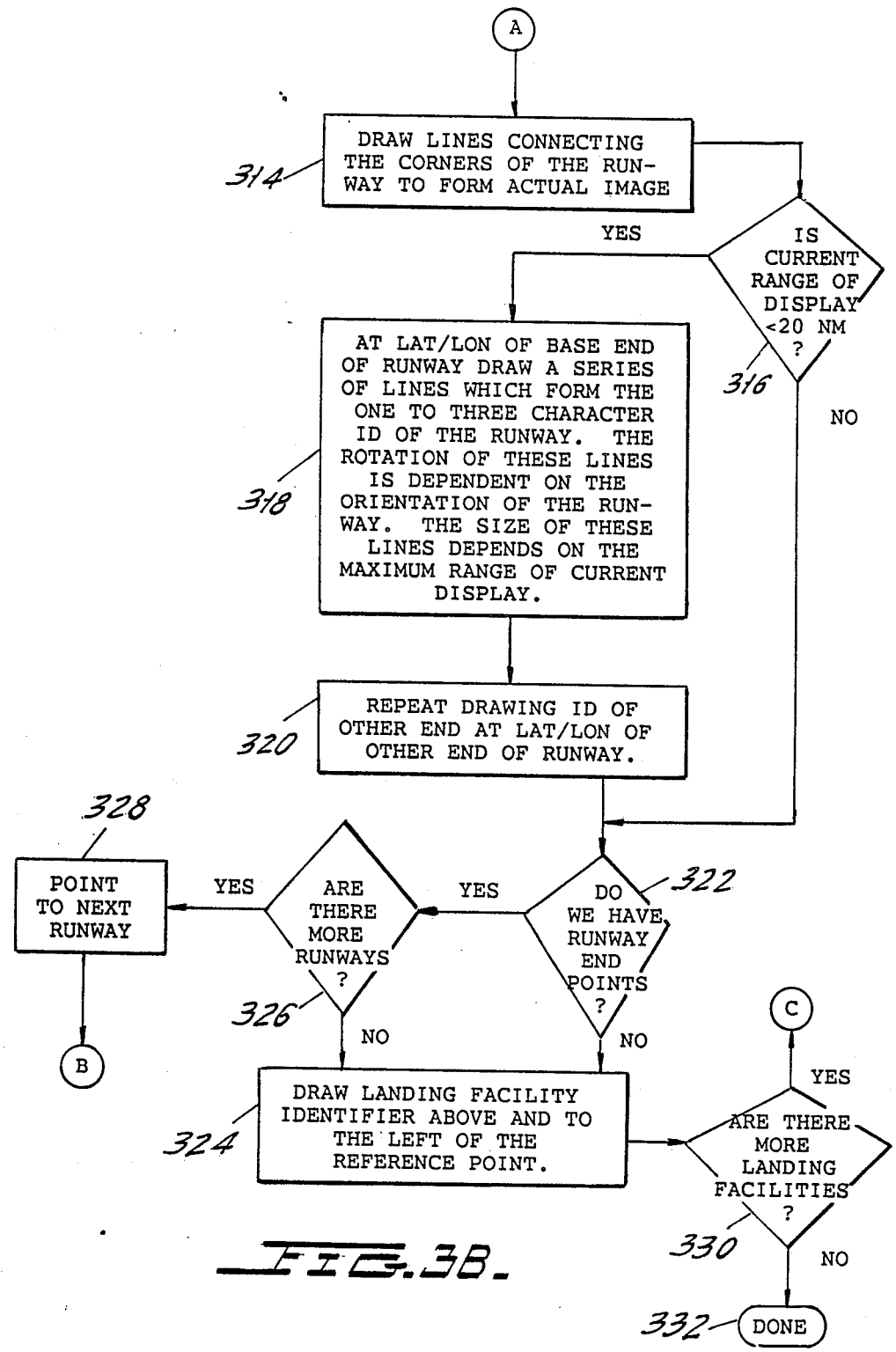

The system hardware described above in connection with FIG. 1 provides the foregoing screen display features of FIGS. 2A and 2B when programmed in accordance with the flow chart of FIGS. 3A and 3B. Connection points in FIGS. 3A and 3B are shown by letters A, B and C.

The start command 300 in FIG. 3A initiates the subroutine described by FIGS. 3A and 3B. In block 302, data of a landing facility is retrieved from the data base. Decision block 304 queries whether the landing facility can be displayed. This may based on geographical location of the facility—a local flight over the western United States would not need to display landing facilities of the eastern United States, for example. Additionally, the pilot may preselect for display only landing facilities meeting certain criteria, in accordance with a further feature of the invention.

The "NO" branch from block 304 directs a search for another landing facility in block 302. The "YES" branch leads to block 306, wherein the latitude and longitude ("LAT/LON") of the landing facility reference point is retrieved from the data base. The reference point is a single point indicating location of a landing facility.

In decision block 308 the question is asked whether the runways have end points (i.e. latitude and longitude points) in the data base. If so, such information is obtained from the data base used, as described in block 310, to calculate the latitude and longitude of the four corners of the runway. If not, the assumption set forth in block 312 is made.

Block 313 then directs calculation of the X/Y Cartesian coordinate location of the runway on screen the display (i.e. on main screen 53 of FIG. 2A, for example). Such calculation is more fully set forth in that block. In block 314, lines are drawn to connect corners of the runway to form an actual image. As queried, in block 316, if the current range of the display is less than 20 nautical miles ("NM"), for instance, then, according to block 318, a series of lines is drawn to form the one to three character identifier of a so-called "base" end of the runway, and in block 320 a similar identifier is drawn at the other end of the runway. FIG. 2A shows an identifier "36" at the lower end of runway 62, for example.

If the current range of display is not less than 20 nautical miles, then, according to block 316, decision block 322 is reached. Block 322 is alternatively reached from block 320.

Decision block 322 asks whether there are runway end points. If not, block 324 directs the drawing of the landing facility identifier (e.g., "APT") in spaced relation to the airport reference point (see block 306). If there are runway end points, decision block 326 is reached, asking whether there are more runways. If not, block 324, described above, is reached. If so, a pointer to the next runway is set according to block 328, and via common connection B, block 310 (FIG. 3A) is again reached.

After exiting block 324, query 330 asks whether there are more landing facilities. If so, block 302 (FIG. 3A) is reached via common connection point C; if not, a completion block 332 is reached.

Display of Navigation Areas in Relation To Aircraft Symbol

FIG. 4 shows a screen display 50 with a main area 53 similar to that of FIG. 2B, but also including terminal control area ("TCA") boundaries 66, 68 and 70, and their respective altitude notations 67, 69 and 71. TCA altitude notation 67, i.e., "77/SFC", indicates a ceiling for TCA area 66 of 7700 feet, and a floor at the ground surface. Notation 69, i.e., "77/50", represents the same ceiling, but a floor of 5000 feet, and notation 71 similarly define the floor and ceiling of area 70.

Boundaries 66, 68 and 70 could represent boundaries of an airport radar service area ("ARSA"), or other navigational control area, rather than a TCA.

FIG. 4 shows navigation areas 66, 68 and 70, in unique manner, in relation to aircraft symbol 56.

Figure 5A:
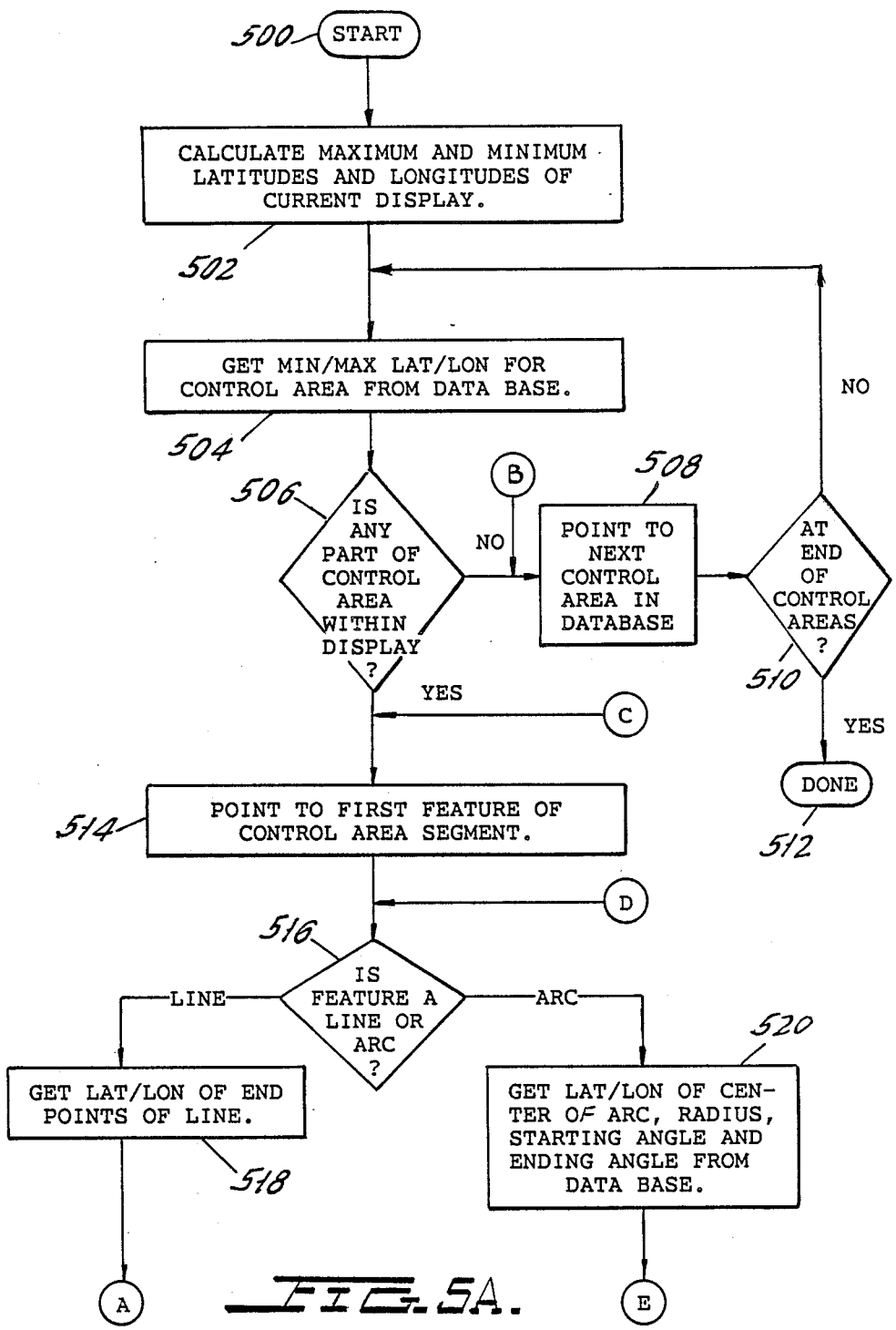
FIGS. 5A and 5B show a flow chart used to implement the features of FIG. 4.
Figure 5B:
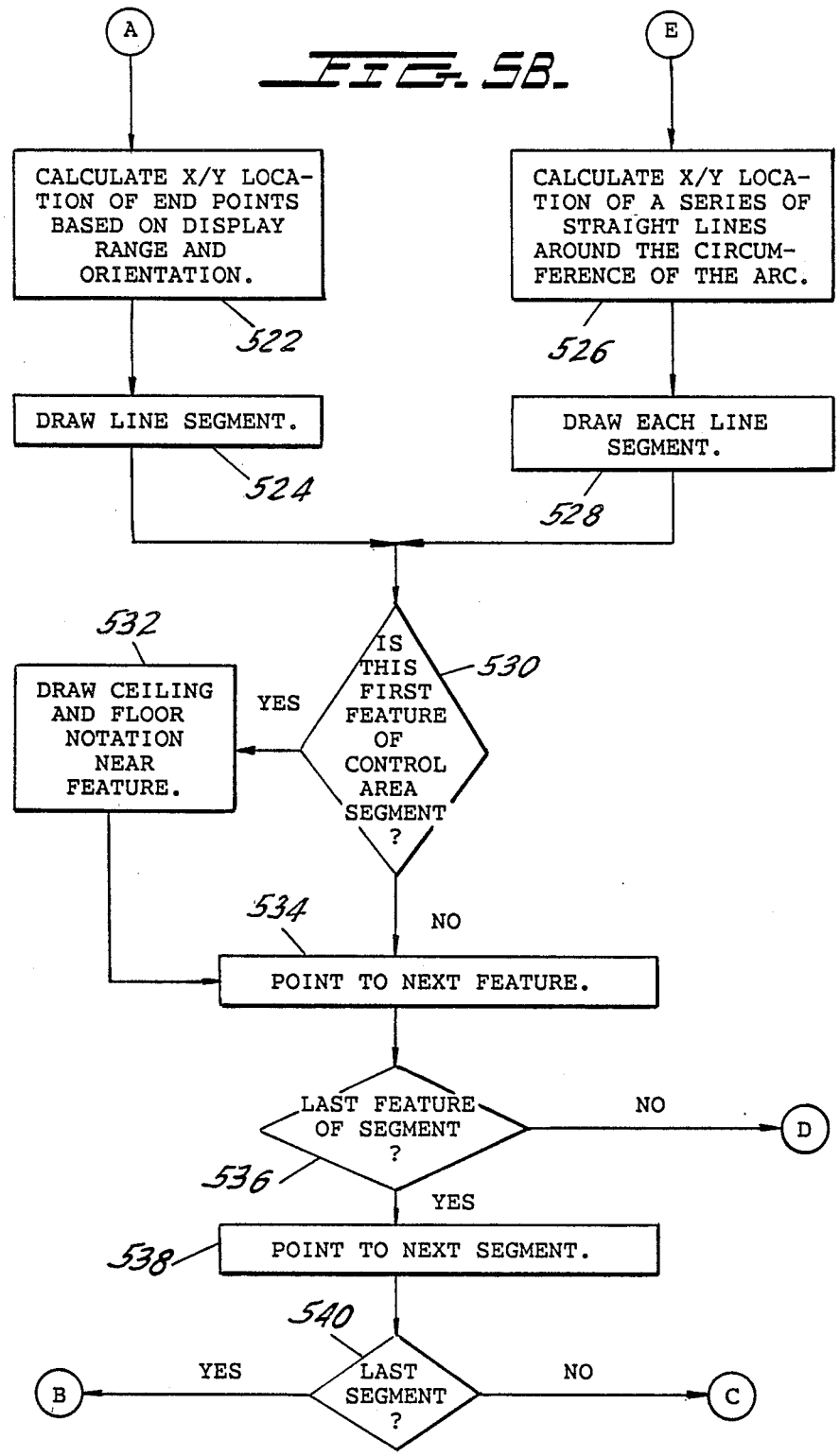

The system hardware described above in connection with FIG. 1 provides the foregoing screen display features of FIG. 4 when programmed in accordance with the flow chart of FIGS. 5A and 5B. Points A, B, C, D and E are common connection points in the flow chart of FIGS. 5A and 5B.

Starting with block 500, the subroutine of FIGS. 5A and 5B first determines minimum and maximum longitudes of the currently displayed area in block 502. In block 504, the minimum and maximum latitudes for a control area are obtained from the data base. At decision block 506, unless some part of the control area is within the display, a next control area is pointed to in the data base, at block 508. At decision block 510, if there are more control areas in the data base, a branch is made to block 504 for the next control area. If there are no further control areas, the subroutine finishes at block 512.

Returning to block 506, if any part of the control area is within the display, block 514 directs the setting of a pointer to a first feature of a segment of a control area. If the feature is a line, decision block 516 routes the program to block 518 to obtain the latitude and longitude of the end points of the line. If the feature is an arc, decision block 514 routes the program to block 520 to get position and configuration information for the arc.

Continuing at FIG. 5B, for a line feature, block 522 coordinates the X/Y placement of the feature on a screen display, and block 524 directs the drawing of such line segment. For an arc feature, blocks 526 and 528 parallel the foregoing operations of blocks 522 and 524.

At decision block 530, if the feature drawn in blocks 524 or 528 is the first feature of a control area segment, block 532 directs the drawing of a ceiling and floor altitude notation near the feature prior to setting a pointer to the next feature of the control area segment in block 534; if such feature is not the first feature, the flow chart goes directly to block 534.

At decision block 536, if pointer is to the last feature of the control area segment, block 538 directs a pointer to the next control area segment; if the feature is not the last feature, a branch is made to decision block 516 via common connection point D.

At decision block 540, if the next segment is the last segment, a branch is made to block 508 via point B; if not, a branch is made to block 514 via point C.

Display of Criteria-Selected Objects

Figures 6A, 6B:
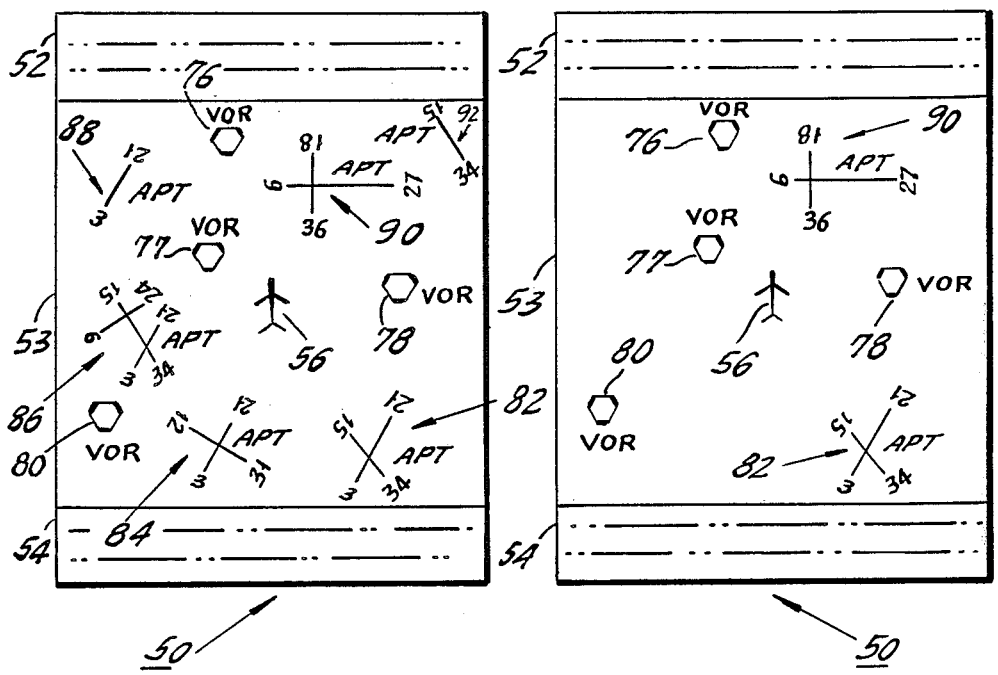
Figure 6C:
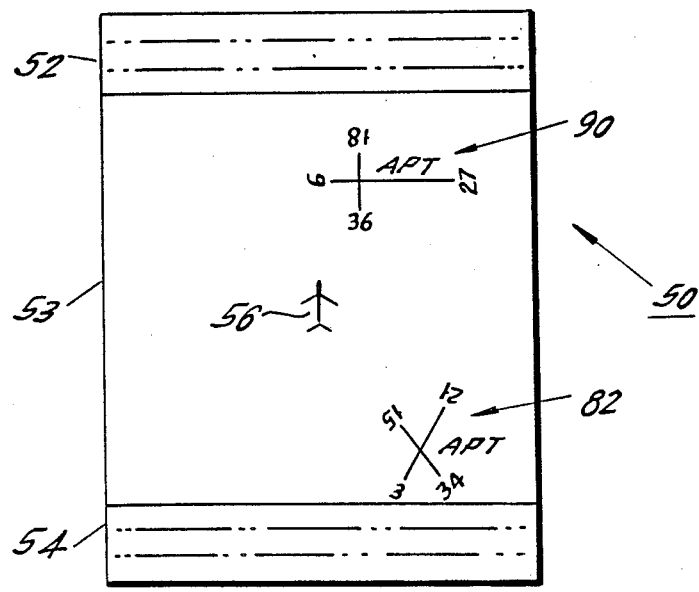

FIGS. 6A, 6B and 6C illustrate a further feature of the invention. FIG. 6A shows a main screen display 53 with VORs or other navigational aids 76, 77, 78 and 80; and airports 82, 84, 86, 88, 90 and 92. Display screen 53 may contain unnecessary or unwanted information that clutters the screen. The pilot-user may be interested only in airports 82 and 90, for example, since they may have suitable runways or available fuel, whereas the other runway shown in FIG. 6A may lack such criteria. According to the present feature, the pilot may select criteria, as by pressing front panel buttons (not shown) to display, as shown in FIG. 6B, only airports 82 and 90, in addition to the VORs, or other navigational aids.

If the pilot wishes to remove an entire category of objects, such as VORs 76, 77, 78 and 80, this is accomplished by user command to remove all VORs, resulting in streamlined screen display 53 of FIG. 6C.

Figure 7:
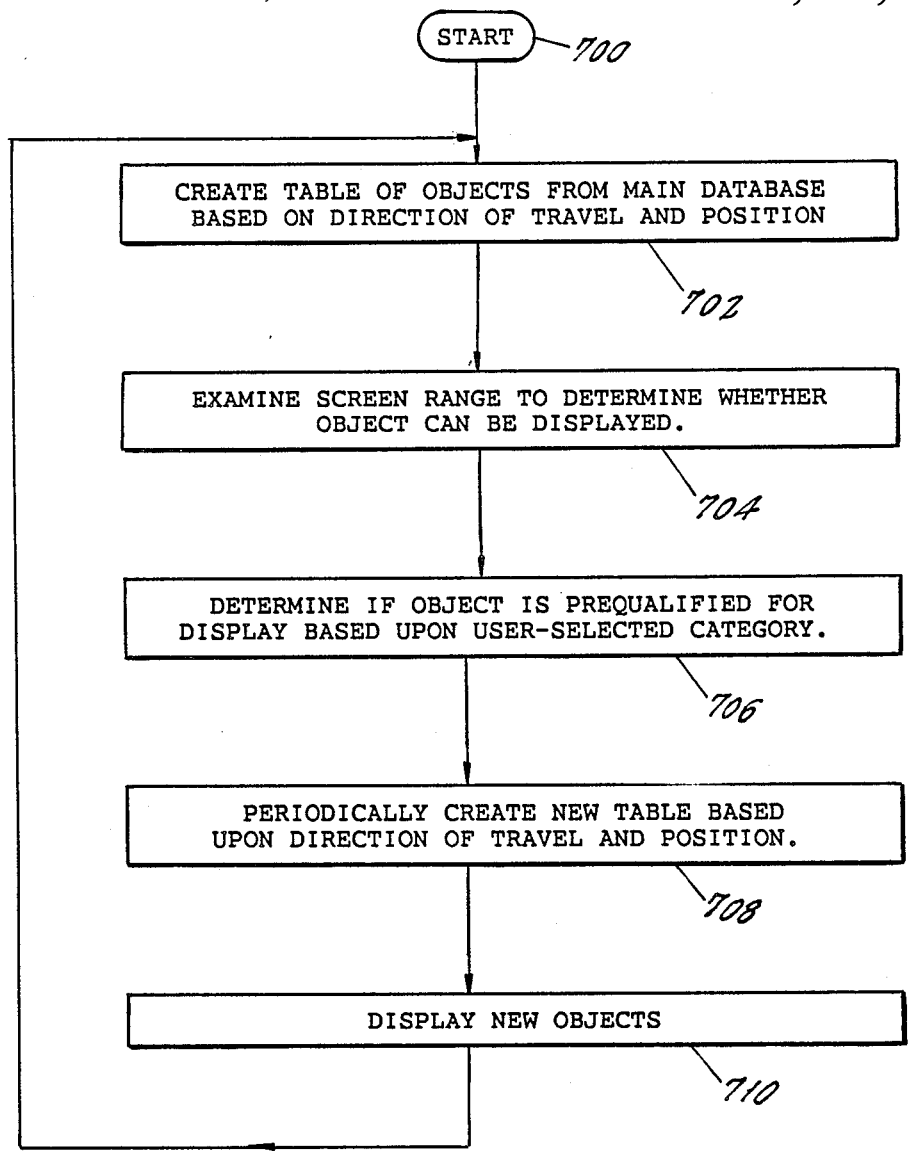
FIG. 7 shows a flow chart used to implement the features of FIGS. 8B and 8C.

The foregoing features can be implemented by programming the hardware of FIG. 1 according to the flow chart shown in FIG. 7.

In FIG. 7, starting from block 700, block 702 directs the creation of a table of objects from the main data base based on direction of travel and position of an aircraft or other vehicle. A far distant airport, for example, would not be included in the table of objects of block 702; only those within a reasonable range of travel are included. Objects shown in the foregoing table are examined one-by-one, in block 704, to determine whether the object falls within the range of the screen display (e.g. 53 in FIG. 6A).

Block 706 requires an object meeting the criteria of block 706 to be examined to see if it is pre-qualified according to user-selected criteria. A pilot-user may wish to display all airports, or only those with runway lengths exceeding a given distance, for example. Alternatively, the pilot may want to exclude all navigational aids of a particular category, which may not be useful for a given flight.

Block 708 directs periodic creation of a new table of objects in block 702 based upon vehicle direction of travel and position. Blocks 702 and 708 can be seen to cooperate to reduce the amount of data which must be searched in blocks 704 and 706.

Block 710 generally instructs the display of new objects meeting the user-selected criteria, and a branch is then made back to block 702, indicating that the process is periodically repeated as the monitored vehicle travels.

Display of Text on Map Data for User-Selected Object

FIG. 8A shows a typical screen display 53 including airports 100 and 102 and a VOR 104. A pilot, by front panel switch command, can select any of objects 100, 102 or 104 to provide immediate text of such objects in display 53.

As shown in FIG. 8B, for example, by selecting airport 100, text 106 appears on the screen adjacent to airport 100. Text 106 contains the identifier "APT" for airport, and the magnetic bearing "BRG" and distance "DIST" to the airport. Box 108 surrounds text 106 so as to highlight that text.

Similar text information 110 in box 112 can be provided for VOR 104, as shown in FIG. 8C.

Figure 9A:
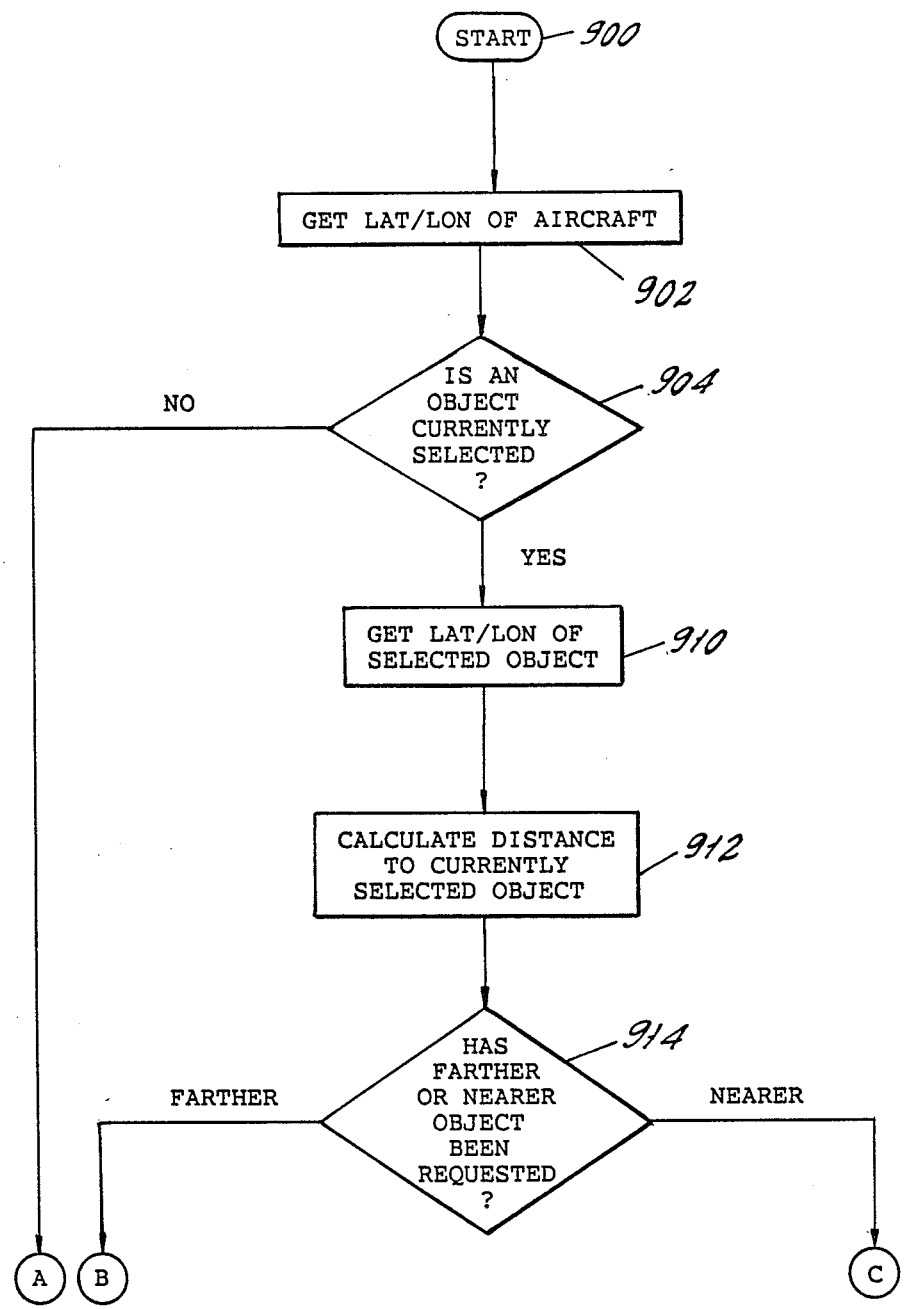
FIGS. 9A and 9B show a flow chart used to implement the features of FIGS. 8B and 8C.
Figure 9B:
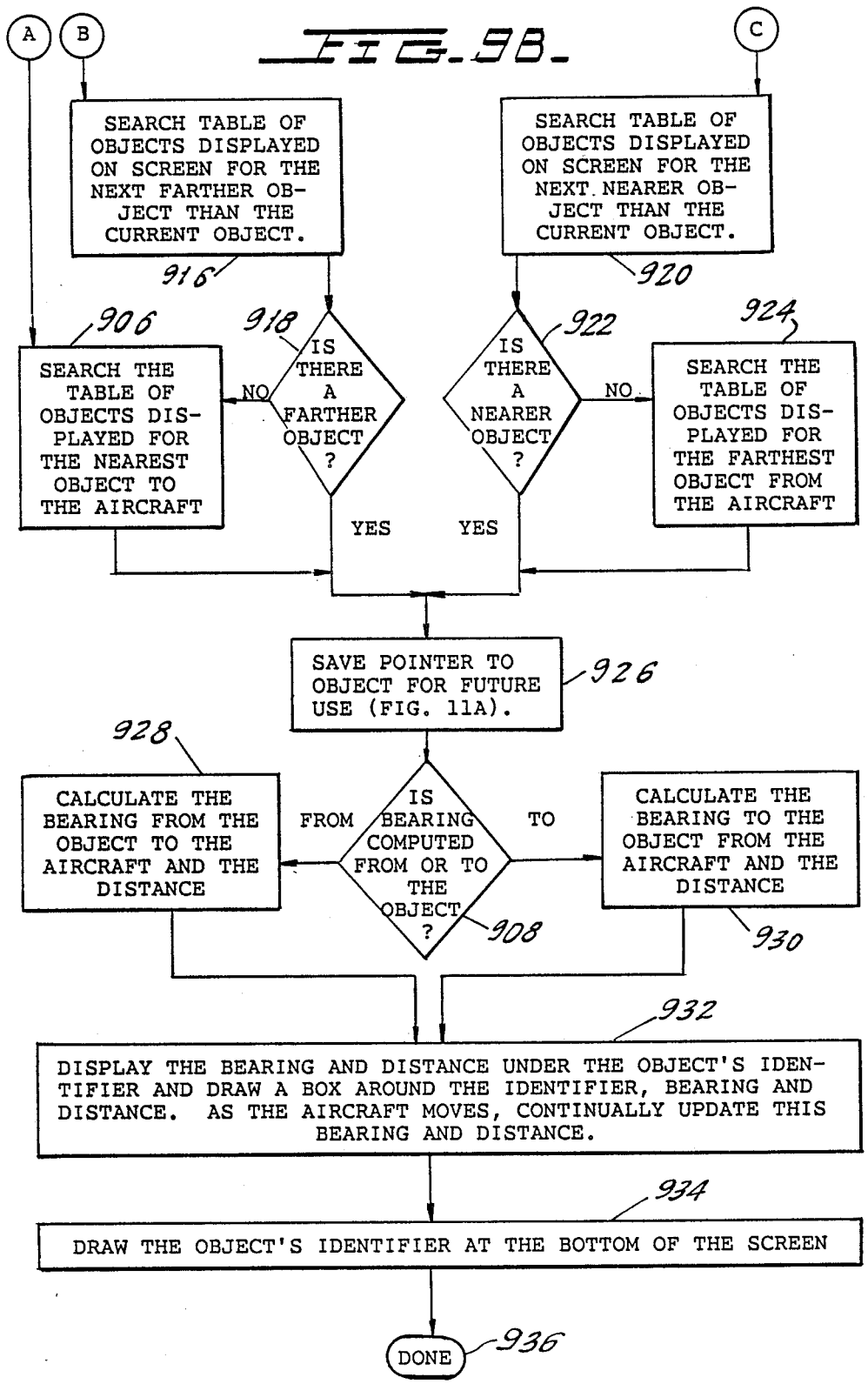

The foregoing features can be implemented on the hardware of FIG. 1 in accordance with the flow chart of FIGS. 9A and 9B. Common connection points A, B, and C are shown in FIGS. 9A and 9B.

Starting from block 900, block 902 in FIG. 9A directs that the latitude and longitude of the aircraft, or other monitored vehicle, be obtained. The decision block 904 basically asks whether the display system of the invention is currently operating in the present mode, and if so, an object is selected. If there is no such object selected, the flow chart branches to block 906 via connection point A to search a table of displayed objects to find the nearest object to the aircraft. Then block 926 is reached, and will be discussed below.

Returning to decision block 904, if an object is currently selected, block 910 requests that the latitude and longitude of the currently selected object be obtained, and block 912 directs calculation of the distance to the currently selected object.

Decision block 914 requests whether the next farther or the next nearer object has been requested. If a farther object has been requested, a branch to block 916 via point B selects a search of a table of displayed objects for the next object farther than the current object. If there is a farther object, decision block 918 directs a branch to block 926, as discussed below. If no farther object can be found, decision block 918 branches to block 906 to search instead for the nearest object to the aircraft.

Returning to decision block 914, if the user has requested a nearer object than the current one displayed, a branch is made to block 920, via point C, to search the table of displayed objects for the next object nearer than the current object. If such an object exists, decision block 922 branches to block 926, discussed below. If not, decision block 922 branches to block 924 to search the table of displayed objects for the farthest object from the aircraft, and then block 926 is reached, as discussed below.

Block 926 directs the saving of a pointer to the object now selected for future use in connection with the flow chart of FIG. 11A, discussed below. Decision block 908 is then reached.

Decision block 908 concerns the type of object located. If the object is of a type wherein the bearing from the object to the aircraft is calculated, block 928 directs such calculation; if the object is of the converse type with the bearing to the object from the aircraft calculated, block 930 directs such calculation. Blocks 928 and 930 also calculate the distance between object and aircraft.

After the calculations of either block 928 or 930 are completed, block 932 directs the display of the bearing and distance under an object identifier in a screen display and, further, to highlight such information, directs a box to be drawn around the identifier, bearing and distance. As the aircraft moves, block 932 directs continual update of such bearing distance. Block 934 directs the drawing of the object's identifier below the main display, e.g. in lower display 54 of FIG. 8A. Completion block 936 is then reached.

Display of Text Concerning User-Selected Object

FIG. 10A shows text 120 for airport 100 of FIG. 8B, for example. Text 120 may include such information as set forth on screen display 53 ("ELEV"=elevation; "VAR°"=magnetic variation; "ID"=identifier; "RAD"=radial; "DIST"=distance; "LEN"=length; "WID"=width; "ILS"=instrument landing system.) Text 120 is for an airport, whereas text 122 of FIG. 10B is for a navigational aid such as a VOR or VORTAC.

Figure 11A:
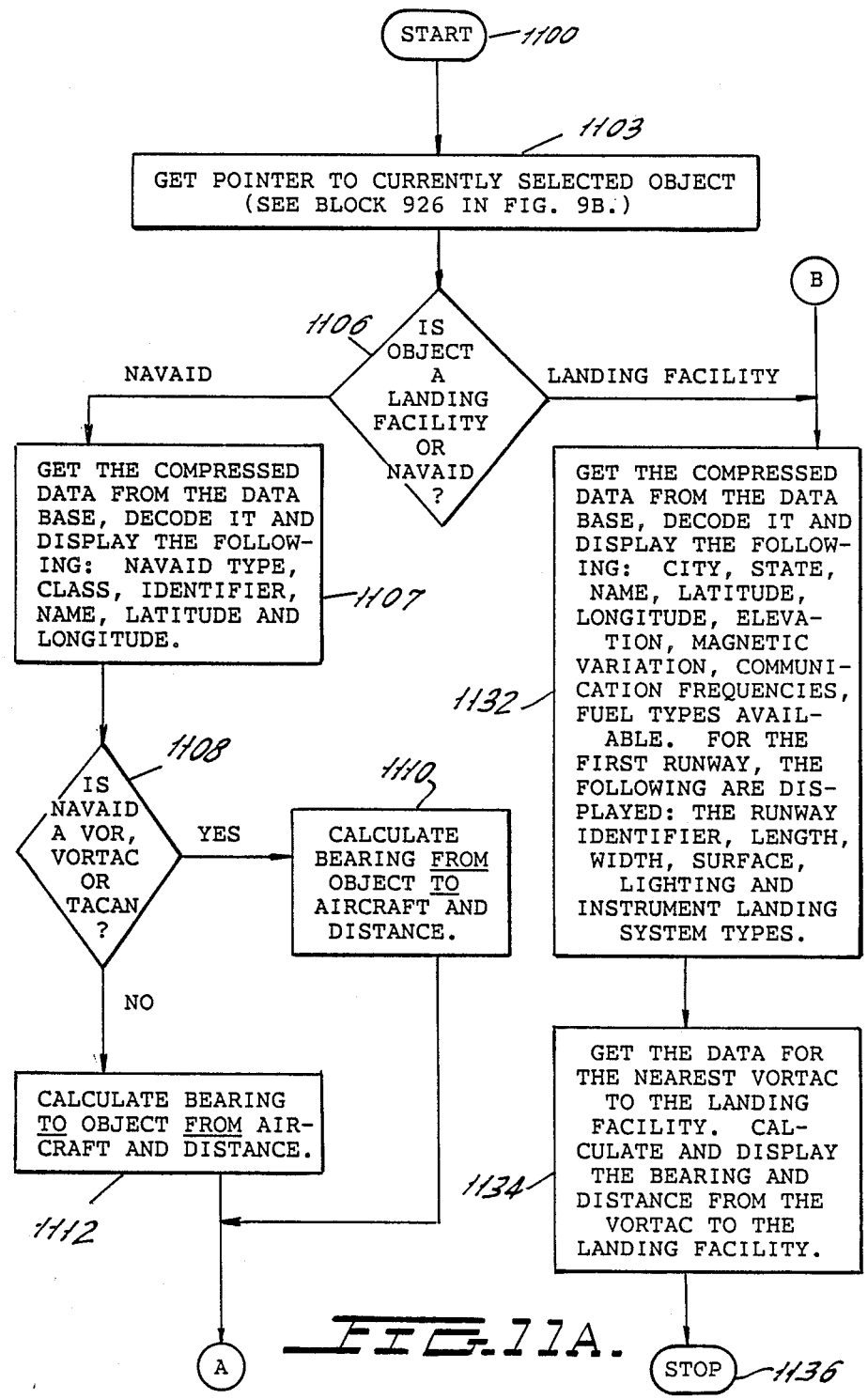
FIGS. 11A and 11B show a flow chart used to implement the features of FIGS. 10A and 10B.
Figure 11B:
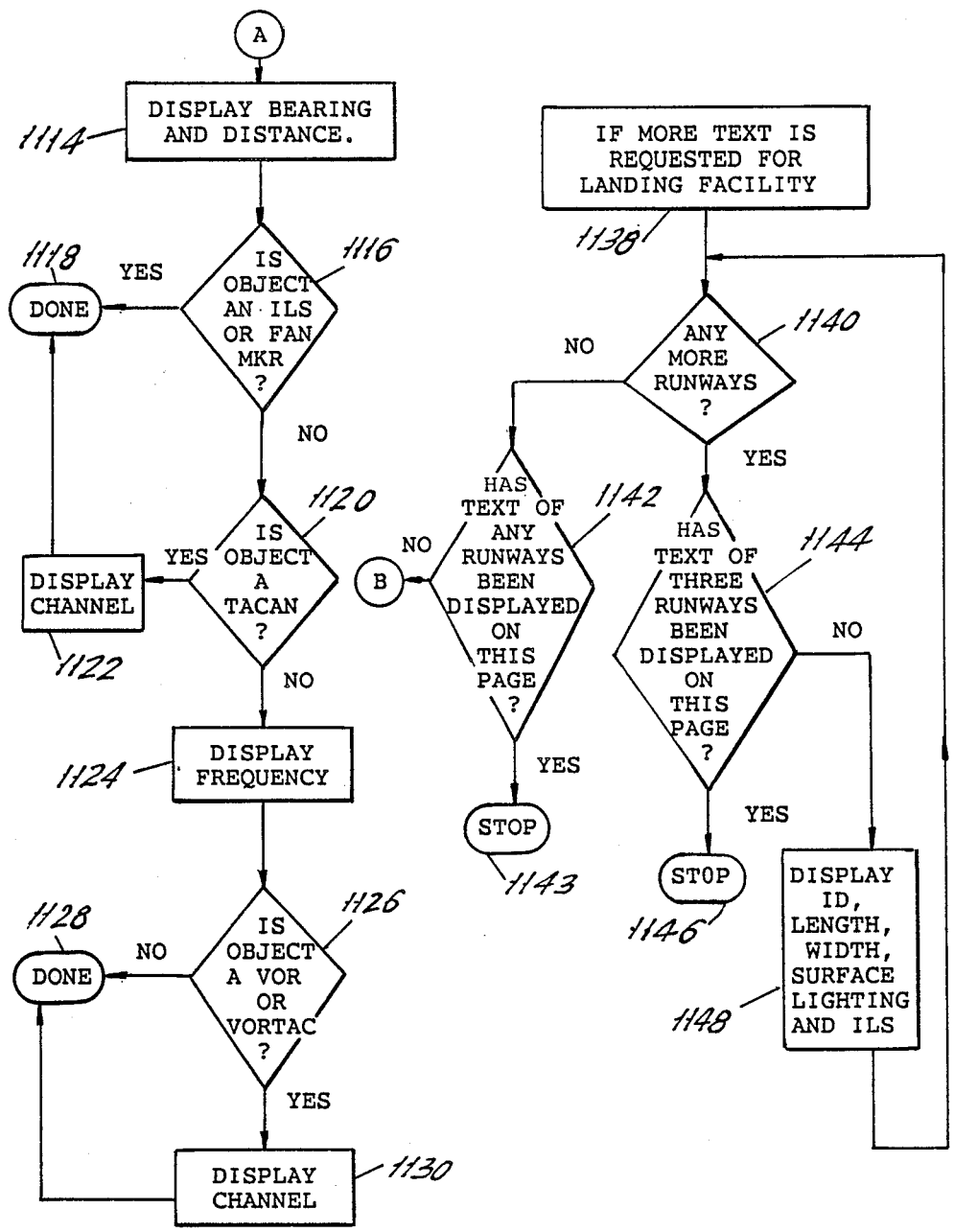

The foregoing features may be implemented on the hardware of FIG. 1 in accordance with the flow charts of FIGS. 11A and 11B. Common connection points A and B are shown in FIGS. 11A and 11B.

Starting from block 1100 in FIG. 11A, block 1103 directs a pointer to the currently selected object. When using the flow chart of FIGS. 9A and 9B, the pointer is already set in block 926 of FIG. 9B. This permits the user to select a specific object with a command non-specific to such object, making operation easier.

Decision block 1106 asks whether the object is a landing facility or a navigational aid ("NAVAID"). If a navaid, block 1107 directs that compressed data be obtained from the data base, decoded and displayed in text form for information of the type contained in block 1107.

The compressed data for the text of block 1107 is preferably used to conserve memory space.

Further information about the navigational aid may then be obtained by using the continuing flow chart. If the navaid is a VOR, VORTAC, or TACAN, as queried by block 1108, block 1110 directs calculation of the bearing from the object to the aircraft and the distance to the object. If not, block 1112 directs calculation of the bearing to the object from the aircraft and the distance to the object. Block 1114 then directs display of the calculated bearing and distance from block 1110 or 1112, and block 1116 further asks whether the object is a instrument landing system ("ILS") or a FAN MARKER system. If so, the present subroutine is completed, as shown by block 1118. If the decision from block 1116 is "NO", the further question is asked in block 1120 whether the object is a TACAN. If so, block 1122 directs the display of the TACAN's channel number, and then the completion block 1118 is reached. If not, the frequency of the object is displayed according to block 1124, and the further question is asked in block 1126 whether the object is a VOR or VORTAC. If not, the completion block 1128 is reached. If so, the channel of the VOR or VORTAC is displayed according to block 1130, and then the completion block 1128 is reached.

Returning to decision block 1106 (FIG. 11A), if the selected object is a landing facility, block 1132 directs that compressed data be obtained from the data base, decoded and displayed as text, such as set forth in block 1132.

Block 1134 requests additional, useful information, set forth in that block, of the nearest VORTAC to the landing facility. The completion block 1136 is then reached.

If still further text is requested for the selected landing facility, according to user command, a further screen of text can be provided in accordance with the flow chart following block 1138.

Decision block 1140 asks whether there are any more runways at the selected airport. If not, decision block 1142 asks whether text of any runways has been displayed on the current page or screen. If so, completion block 1144 is reached. If not, a branch is made via point B to block 1132 to replace the displayed runway data with general data about the landing facility. Decision block 1140 may then be reached again if the user requests more information in block 1138. If there are more runways, decision block 1144 then asks whether the text of three runways has been displayed on the current "page", or screen. If so, completion block 1146 is reached. If not, block 1148 creates the display of the runway identifier, length, width, surface, lighting and instrument landing system for that runway. Decision block 1140 is then revisited.

Alert for Increased Oncoming Minimum Safe Altitude

Figure 12:
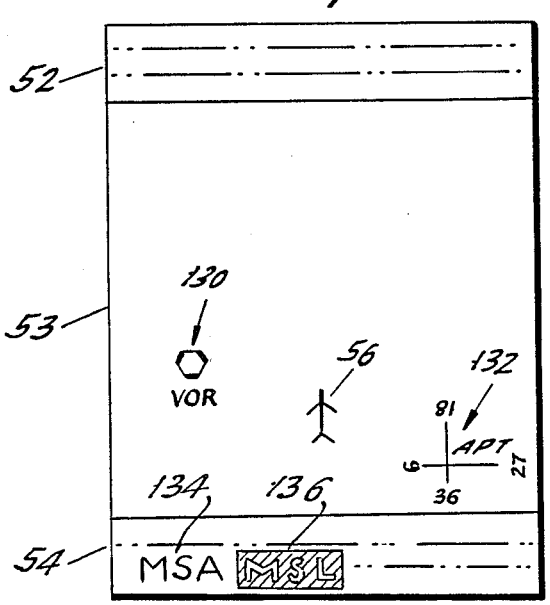
FIG. 12 shows a screen display with an alert for an increased oncoming minimum safe altitude.

In FIG. 12, screen display 53 shows, as typical objects, VOR 130 and airport 132. A minimum safe altitude ("MSA") notation 134, followed by a mean sea level ("MSL") notation 136, appears in the lower screen display 54. MSA 134 is the highest MSA for the range displayed on main screen 53, although it could be for more or less than the full displayed range.

To obtain the MSA for a given range, the MSA for each 30 by 30 nautical mile square, e.g., in a grid is read as long as such square lies partly or totally in the given range.

A larger-than displayed range is scanned to search for an MSA that is greater than 1000 feet, or some other distance, above the currently displayed MSA 134. Aircraft symbol 56 is preferably located less than one-third the way from bottom to top of main display 53, e.g., one-fifth the way as shown, so that the scanned area lies mostly in front of the monitored aircraft.

In accordance with the present feature, MSA notation 134 is highlighted by having MSL notation 136 appear in reverse video, similar to a photographic negative, rather than as a normal, positive image. This alerts the pilot of the danger that lies ahead.

Figure 13:
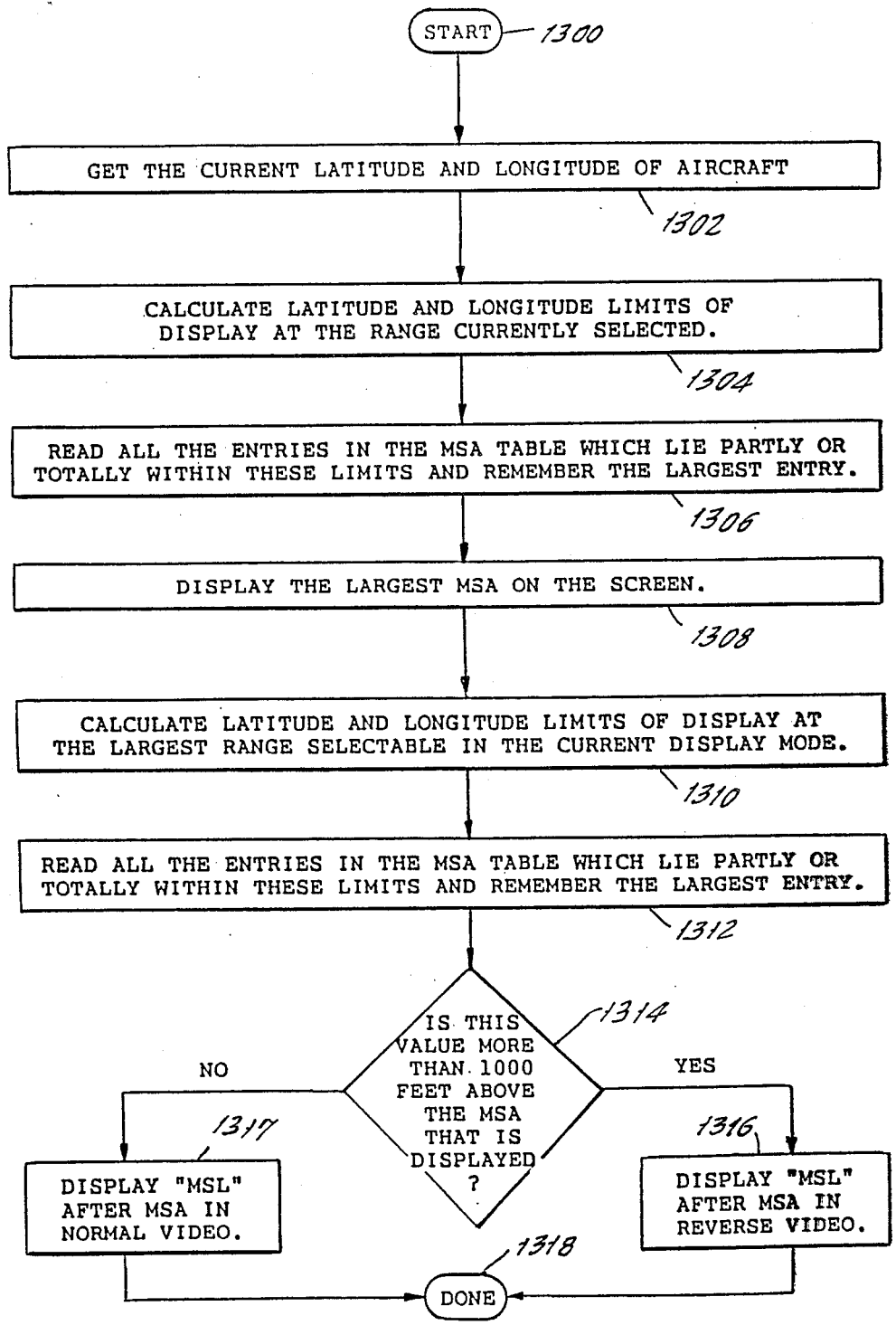
FIG. 13 shows a flow chart used to implement the features of FIG. 12.

The foregoing features may be implemented on the hardware of FIG. 1 in accordance with the flow chart of FIG. 13.

Starting at block 1300 in FIG. 13, block 1302 directs that the current latitude and longitude of the monitored aircraft be obtained. Block 1304 directs calculation of the latitude and longitude limits of the display at the currently selected range. Block 1306 then requires the reading of all the entries in the minimum safe altitude ("MSA") table which lie partly or totally within the limits obtained in block 1304. The largest entry is also stored. Block 1308 directs the display of the largest MSA on the screen, typically in lower display 54 of FIG. 12.

Block 1310 then directs that the latitude and longitude limits of the largest range selectable in the current display mode be calculated. The purpose is to obtain a larger-than-displayed range in which to search for increased MSAs; therefore, a larger-than-displayed range could be selected in a different way. Block 1312 then directs that all the entries in the MSA table which lie partly or totally within the larger-than-displayed range be read, and that the largest entry be stored.

Decision block 1314 asks whether the largest MSA in the larger-than-displayed range is more than a thousand feet, or some other distance, above the MSA that is currently displayed. If so, an alert is provided. This may be done by displaying the mean sea level ("MSL") notation, which follows a normally displayed MSA, in reverse video (i.e., like a photograph negative), according to block 1316.

If the largest MSA in the larger-than-selected range is not more than a thousand feet above the currently displayed MSA, block 1317 directs display of the MSL term in normal video (i.e., like a photograph positive) after the normally displayed MSA.

The subroutine is completed at block 1318, but is periodically repeated as the monitored aircraft travels.

Moving Aircraft on Stationary Background

Figure 14A:
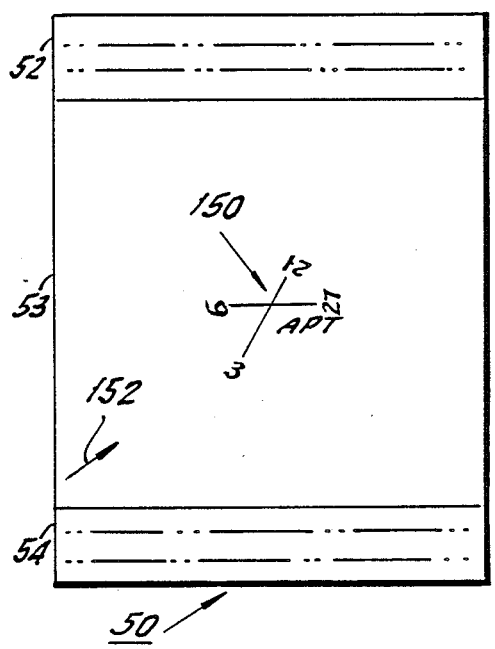
FIGS. 14A and 14B illustrate screen displays with background map data held stationary, and a symbol for the aircraft that moves with respect to the background map data when in the displayed range.

FIG. 14A shows screen display 53 centered on a preselected "waypoint", or object along the way, 150. The pilot preferably preselects waypoint 150 by inputting identifying data (e.g., latitude and longitude) through a LORAN C receiver, which then sends such information through RS-232C input 18 (FIG. 1) to the hardware system 10. The waypoint identifying information could also be supplied to the hardware system of FIG. 1 from other navigational equipment onboard the aircraft.

Waypoint 150 in FIG. 14A is an airport. An arrow 152 near the edge of display 53 indicates the bearing of the monitored aircraft. The position of the aircraft is outside the displayed range in FIG. 14A; therefore, arrow 152, different from symbol 56 in FIG. 2A, for example, is used to represent the monitored aircraft. In FIG. 14A, the background map data remains stationary and arrow 152 represents the aircraft. Display 53 is typically oriented with north towards the top center of the display.

When the monitored aircraft comes within the displayed range of main display 53, a different aircraft symbol 152′ is used, to show movement of the aircraft.

Figure 15A:
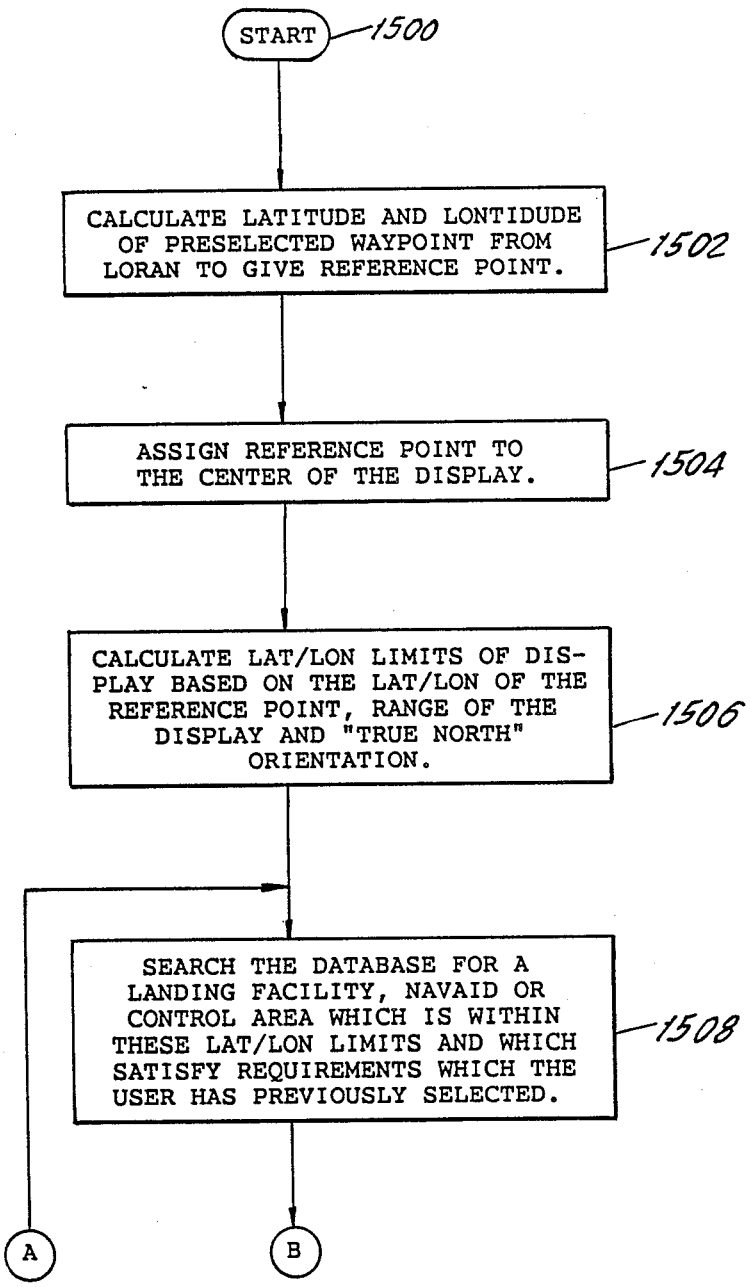
FIGS. 15A and 15B show a flow chart used to implement the features of FIGS. 14A and 14B.
Figure 15B:
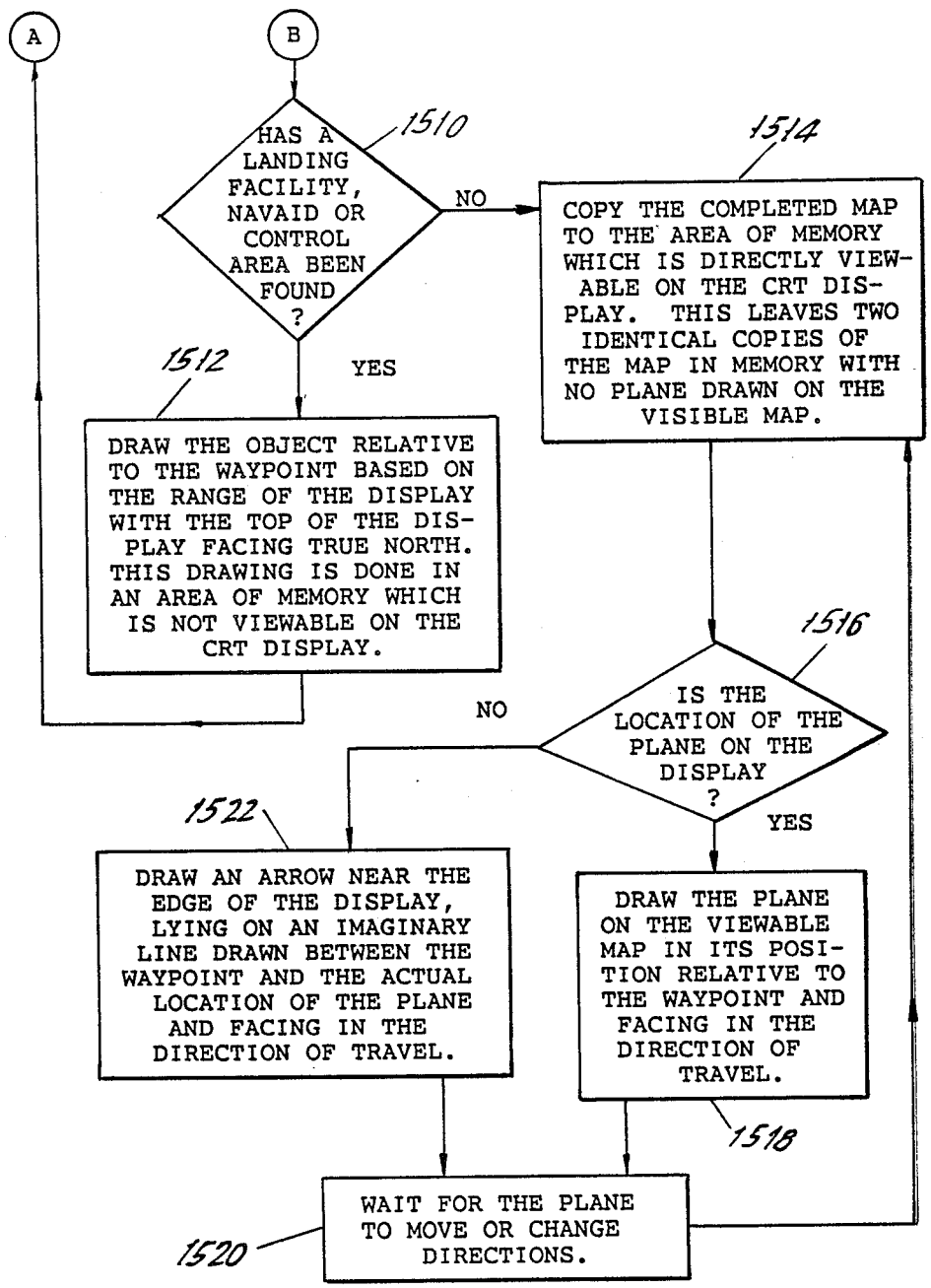

The foregoing features can be implemented on the hardware of FIG. 1 in accordance with the flow chart of FIGS. 15A and 15B. Points A and B are common connection points in FIGS. 15A and 15B.

Starting at block 1500 in FIG. 15A, block 1502 instructs the calculation of the latitude and longitude of a preselected waypoint from the LORAN receiver to provide a reference point. The waypoint is a user-selected object or arbitrary location, which is contained in the screen display. According to block 1504, such reference point is preferably at the center of the display. Block 1506 directs the calculation of the latitude and longitude ("LAT/LON") limits of the display based on the factors set forth in that block. Block 1508 then directs the search of the data base for suitable objects for display within the latitude and longitude limits calculated in block 1506. Suitable objects may be those meeting previously selected user criteria, for example, according to a feature of the invention described above in connection with FIGS. 6A, 6B, 6C and 7.

Decision block 1510 asks whether a landing facility, navigational aid, or control area has been found.

If an object has been found, block 1512 directs the drawing of the object according to the criteria set forth in that block. The drawing is done in an area of memory not viewable by the cathode ray tube display. A branch is then made from block 1512 to block 1508 via connection point A to search for another object for display.

When decision block 1510 is reached with a negative answer, block 1514 directs the copying of the completed map to an area of memory directly viewable on the cathode ray tube display. Block 1514 explains that this leaves two identical copies of the map in memory with no plane, or aircraft, drawn on the visible map.

Block 1516 then asks if the location of the plane is on the display. If so, block 1518 directs the drawing of the plane on the viewable map in its true position relative to the waypoint and block 1520 causes a periodic recycling back to decision block 1516 to update the display.

If the location of the plane is not on the display, block 1516 branches to block 1522, which directs the drawing of an arrow near the edge of the display to represent the oncoming direction of flight of the plane towards the waypoint.

Emergency Display of Nearest Suitable Airports

Figures 16A, 16B:
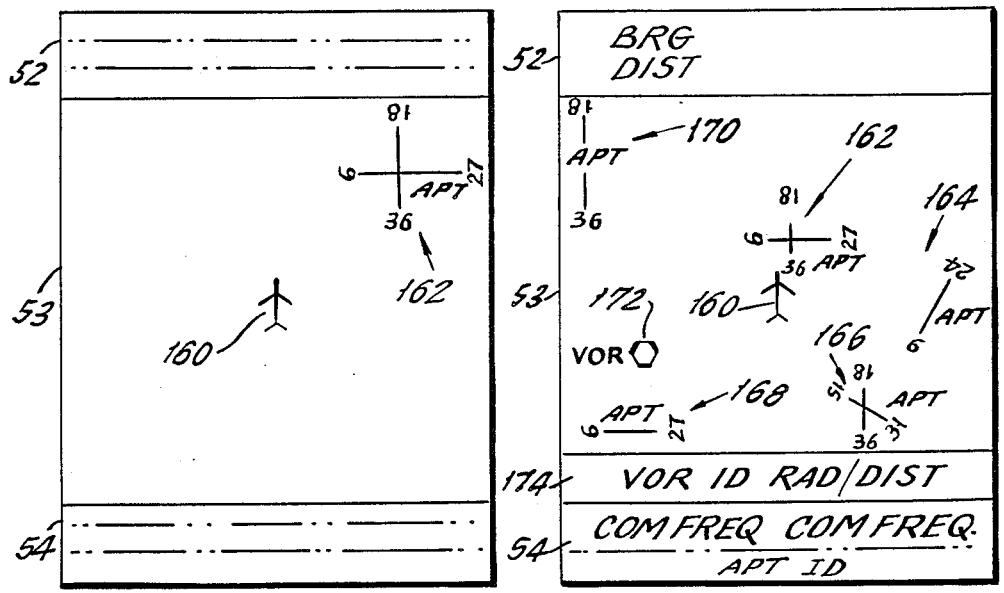

FIG. 16A shows a typical screen display 53, with aircraft symbol 160 and a typical airport 162. If an emergency develops and the aircraft must land quickly, a user command will produce screen display 50 of FIG. 16B. Main display 53 shows at least five airports 162, 164, 166, 168 and 170 suitable for landing, according to preselected user criteria. The range of display 53 is automatically adjusted to include such suitable airports.

Screen display 53 also shows the nearest VOR, VORTAC or similar navigational aid 172 and, at lower portion 174 of main display 53, for example, also shows an identifier for the navigational aid ("NAVAID"), and the radial and distance from such navigational aid to the monitored aircraft. Normal text information in upper and lower displays 52 and 54 is preferably deleted; the bearing and distance to the closest airport are displayed in the upper display 52; and the airport identifier and communication frequency for the airport are displayed in the lower screen display 54. Such text information can obviously be arranged in different ways.

By a scrolling command, the pilot may select any other of the displayed airports to obtain upper and lower screen displays 52 and 54 of text specific to the newly selected airport.

Figure 17A:
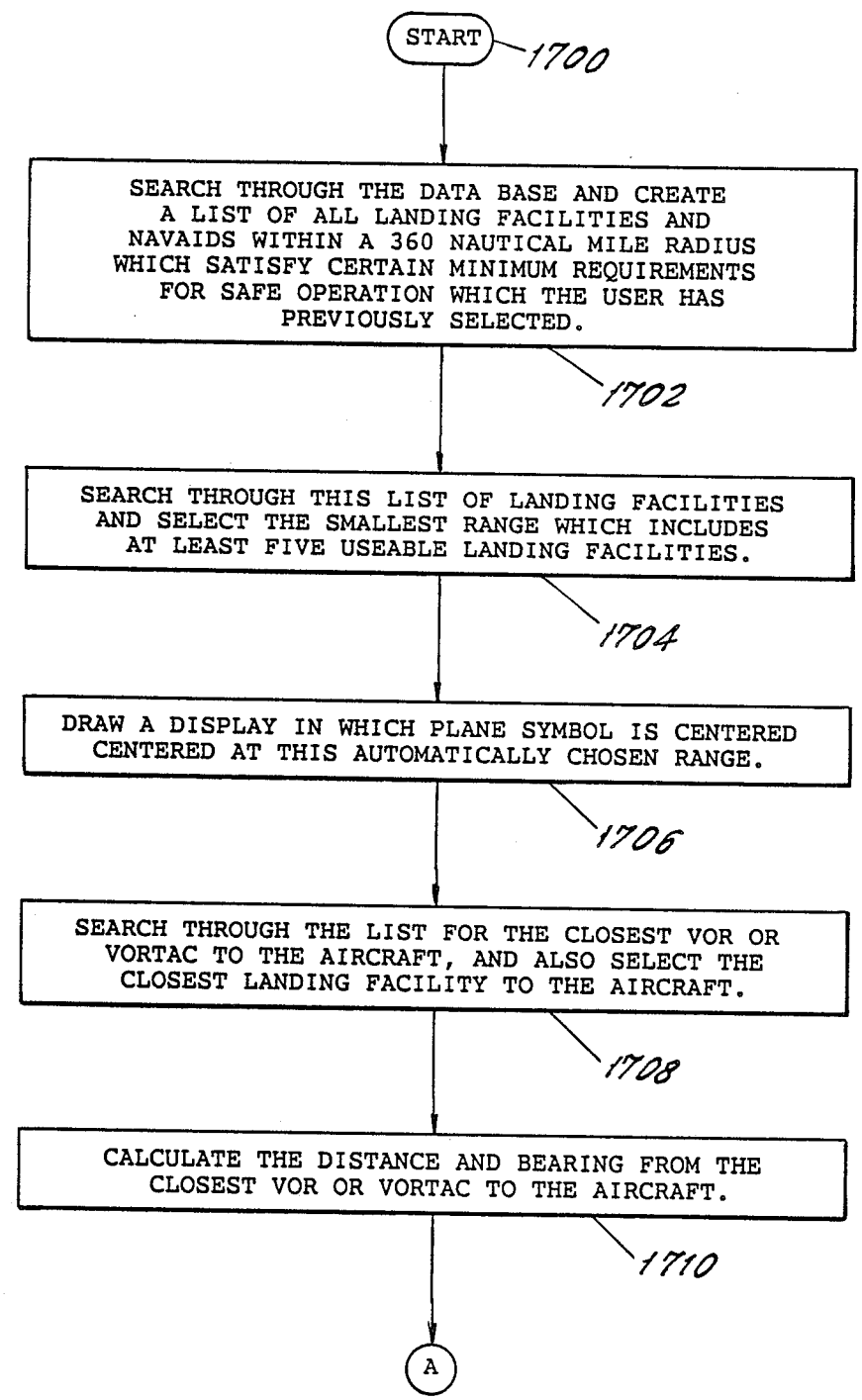

The foregoing features may be implemented on the hardware of FIG. 1 in accordance with the flow chart of FIGS. 17A and 17B. Connection point A is common between FIGS. 17A and 17B.

Starting at block 1700 in FIG. 17A, block 1702 directs a search through the data base to create a list of all landing facilities and navigational aids within a predetermined radius satisfying preselected minimum requirements for safe operation. When establishing a flight plan, the user will typically select the requirements for safe operation, such as minimum runway length, and lighting for night landing.

Block 1704 directs a search through the list created in block 1702 and selects the smallest range including at least a predetermined number of usable landing facilities. Block 1706 directs the drawing of a display in which a plane symbol is centered, for example, at the range automatically chosen in block 1704.

Block 1708 then directs the search through the list established in block 1702 for the closest VOR or VORTAC. Block 1708 also directs the selection of the closest landing facility to the aircraft, from the list of block 1702.

Block 1710 then directs the calculation of the distance and bearing from the closest VOR or VORTAC, or similar navigational aid, to the aircraft. Block 1712 then directs the display of the identifier, bearing and distance of the VOR or VORTAC (or similar navigational aid). Such display is typically placed at the lower part of the main display, such as in area 174 shown in FIG. 16B. Block 1712 also directs a continued update of such bearing and distance as the vehicle moves.

Block 1714 directs display of the identifier and communications frequencies for the selected landing facility, and such display may also be below the main screen display. Block 1716 directs the calculation of the distance and bearing from the aircraft to the selected landing facility, and block 1718 directs display of such information, which may be above the main display.

As the plane moves, block 1718 also directs the continual updating of such bearing and distance information, and the completion step is then reached at block 1720.

Display of Projected and Actual Flight Patterns

Figure 14B:
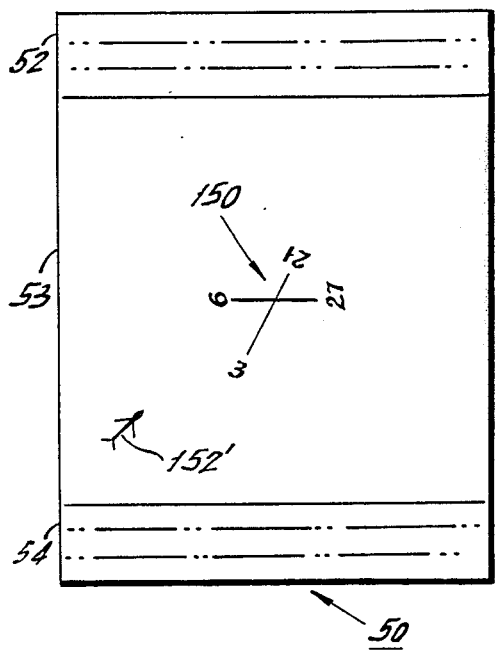
Figure 18A:
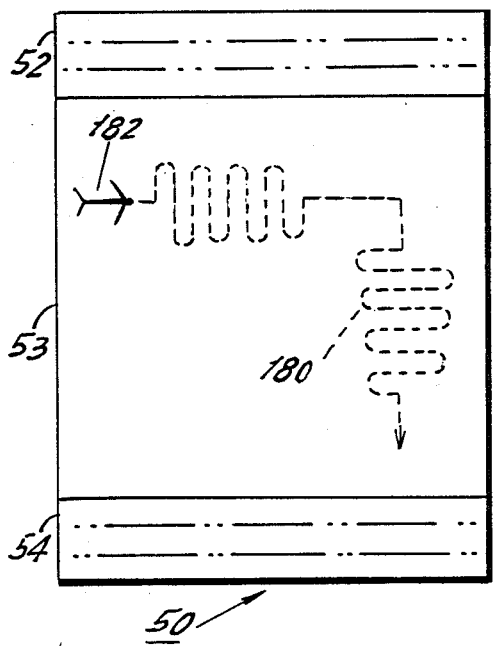
Figure 18B:
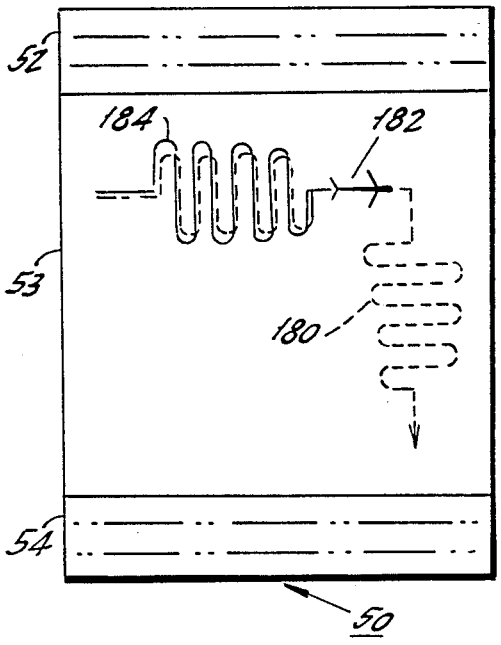
FIG. 18B shows the same vehicle symbol and a path of its actual travel pattern after it has followed a portion of the preselected flight pattern.

FIG. 18A shows a screen display 53 with a projected flight pattern 180 shown in dashed line form. Main display 53 may include map data, such as in FIG. 14A, and any map data and projected flight pattern 180 are preferably held stationary in the display. Aircraft symbol 182 then moves about display 53, in the same way described above with respect to FIGS. 14A and 14B. As the monitored aircraft proceeds toward and along projected flight pattern 182, an actual flight pattern 184 of where it has flown is generated, as shown in FIG. 18B.

The foregoing features can be implemented on the hardware of FIG. 1 by including sufficient nonvolatile memory in the data base board 36 to store the projected and actual flight pattern.

The foregoing describes a map display system with various features that can be used alone or together. The map display system is particularly useful for an airborne vehicle, since it conveys to a pilot-user a large amount of relevant, easy-to-read information in a brief period of time. The system, further, incorporates safety features tailored for navigation of an airborne vehicle.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Map display system for navigation of a vehicle showing selected map features in true size and orientation in relation to background map data, the system comprising:

memory means to store map data of an area in which the vehicle may travel; such data including background map data in a first memory location; reference location points of selected map features in a second memory location, and true size and orientation data of such selected map features in a third memory location;

first means to selectively collect background map data from the memory means and to compose a first image component of such data;

second means to selectively collect from the memory means reference location points of one or more individual features from the selected map features and true size and orientation data of the one or more selected features within the range of the first image component and to compose a second image component of the one or more selected map features aligned with and in true size proportion to the first image component; and display means to collectively display the first and second image components.

2. The map display system of claim 1, wherein the vehicle comprises an aircraft and the selected map features comprise aircraft landing and take-off areas.

3. The map display system of claim 2, further comprising:

third means to compose a third image component of a symbol for the aircraft;

means to receive position and direction of travel data for the aircraft and to determine placement of the third image component relative to the first and second image components; and means included in the display means to display the third image component along with the first and second image components.

4. The map display system of claim 2, wherein the landing and take-off areas comprise runways, the memory means comprises means to store identifiers of runway ends, and the second means includes means to collect data of such identifiers and to include the same in the second image component.

5. The map display system of claim 3, wherein the first and second means include respective means to repeatedly recompose the first and second image components to show movement of such image components, and the third means includes means to maintain the third image component in static position.

6. The map display system of claim 3, wherein the first and second means include respective means to hold the first and second image components in static position, and the third means includes means to repeatedly recompose the third image component to show movement of the aircraft symbol.

* * * * *